United States Patent
Vij et al.

(10) Patent No.: US 12,468,566 B1
(45) Date of Patent: Nov. 11, 2025

(54) REDUCED DOWNTIME MIGRATION OF VIRTUALIZED SOFTWARE SERVICES

(71) Applicant: Loophole Labs, Inc., New York, NY (US)

(72) Inventors: Shivansh Vij, Vancouver (CA); Felix Michel Pojtinger, Vancouver (CA); James Edward Moore, Stowmarket (GB); Alex Sørlie, Bergen (NO)

(73) Assignee: Loophole Labs, Inc., New York, NY (US)

( * ) Notice: Subject to any disclaimer, the term of this patent is extended or adjusted under 35 U.S.C. 154(b) by 0 days.

(21) Appl. No.: 18/926,549

(22) Filed: Oct. 25, 2024

Related U.S. Application Data

(60) Provisional application No. 63/671,933, filed on Jul. 16, 2024.

(51) Int. Cl.
   *G06F 9/455* (2018.01)

(52) U.S. Cl.
   CPC ...... *G06F 9/45558* (2013.01); *G06F 9/45508* (2013.01); *G06F 2009/4557* (2013.01)

(58) Field of Classification Search
   CPC ............. G06F 9/45558; G06F 9/45508; G06F 2009/4557
   See application file for complete search history.

(56) References Cited

U.S. PATENT DOCUMENTS

| | | | |
|---|---|---|---|
| 2017/0060628 A1* | 3/2017 | Tarasuk-Levin | H04L 63/0209 |
| 2018/0060107 A1* | 3/2018 | Hu | G06F 9/45558 |
| 2018/0060117 A1* | 3/2018 | Maskalik | G06F 9/4856 |
| 2018/0213036 A1 | 7/2018 | Vasetsky et al. | |
| 2019/0361724 A1* | 11/2019 | Mcclure | G06F 9/4856 |
| 2022/0382574 A1* | 12/2022 | Gopalan | G06F 11/0793 |
| 2023/0062733 A1 | 3/2023 | Chu et al. | |
| 2023/0112225 A1* | 4/2023 | Franciosi | G06F 9/45558 718/1 |
| 2023/0130553 A1* | 4/2023 | Radev | G06F 16/185 714/4.11 |
| 2023/0185604 A1 | 6/2023 | Chakaravarthy et al. | |
| 2024/0028365 A1 | 1/2024 | Li et al. | |

OTHER PUBLICATIONS

Kerrisk, Michael, "Linux/UNIX system programming training—mmap(2)—Linux manual page", 14 pages, https://man7.org/linux/man-pages/man2/mmap.2.html., Jun. 26, 2024.

Rapoport, Mike, "Userfaultfd: Post-copy VM migration and beyond [PowerPoint slides]", IBM, 30 pages.

\* cited by examiner

*Primary Examiner* — Kenneth Tang

(57) ABSTRACT

Provided herein are various enhancements for low downtime migration of virtualized software services across different instantiations, which may include real-time migration over different cloud/server providers and platforms, physical locations, network locations, and across different network elements. Examples herein include handling of migration of data and state for virtualized software services, migration of ingress and egress traffic for the software services, and migration of other various operations aspects applicable to virtualized software services. In many instances, a client node retains the same network addressing used to reach the virtualized software services even as the virtualized software services move to different network locations and physical locations.

20 Claims, 9 Drawing Sheets

REDUCED DOWNTIME MIGRATION OF VIRTUALIZED SOFTWARE SERVICES

RELATED APPLICATIONS

This application hereby claims the benefit of and priority to U.S. Provisional Patent Application 63/671,933, titled "REDUCED DOWNTIME MIGRATION OF VIRTUALIZED SOFTWARE SERVICES," filed Jul. 16, 2024, which is hereby incorporated by reference in its entirety.

TECHNICAL BACKGROUND

Virtualization of computing environments provides for the abstraction of physical hardware resources and subsequent allocation of such resources among concurrent virtual machines or other compartmentalized software structures. A hypervisor is typically employed as a management layer between physical hardware and the virtual machines, and can perform resource scheduling, resource sharing, resource allocation, hardware abstraction, among other functions. Among these functions are providing primary/main memory (e.g., random access memory or RAM) and secondary storage (e.g., disk or solid-state storage) emulation to the virtual machines. A virtual machine can thus be provided with an appropriate bundle of emulated or virtualized hardware resources, which can be deployed by the hypervisor on-the-fly as these virtual machines are instantiated and de-instantiated on an associated underlying set of physical hardware.

Cloud and distributed computing schemes have enabled deployment of computing resources across various physical data centers, cloud computing centers, and other physical locations, which can see dynamic deployment of virtual machines which change in quantity and location in accordance with available computing/network resources, costs, demand, bandwidth availability, desired qualities of service, and other various factors. A common use case is having a client node, such as an end user, requesting access to a remotely located computing resource over a network link, with a software service responsively spawned as a virtual machine to service that client node.

As operating conditions change during an active session supporting a software service, a migration of a virtual machine to another set of hardware might be desired. Operating conditions include costs of using corresponding computing resources, network conditions (e.g., availability, bandwidth, latency), workload patterns, resource utilization capabilities, time of day, and other conditions. The migration can include "live" migration techniques that attempt to migrate a currently-active software service without interruption of service to a client node.

However, current migration techniques still produce lag and interruptions to an end user or client node, and can require relatively long periods to copy data over a network link to instantiate new virtual machines, such as when moved to a different data center. Moreover, migrating network addressing and network routing resources associated with computing resources can be complex and force client nodes to halt existing network connections and establish new network links for migrated resources. This can increase client node complexity, as well as introduce unwanted opportunities for downtime, service latency, service interruptions, dropped/lost network packets, and overall reduced quality of end user experiences.

SUMMARY

Provided herein are various enhancements for low downtime migration of virtualized software services across different instantiations, which may include real-time migration over different cloud/server providers and platforms, physical locations, network locations, and across different network elements. Migration of virtualized software services can involve moving a virtual machine from one host to another, with the intention of reducing disrupted service by minimizing downtime during the process. Examples herein include enhanced handling of migration of data and state for virtualized software services, migration of network arrangements for ingress and egress traffic for the software services, and migration of other various operations aspects applicable to virtualized software services. In many instances, a client node retains the same network addressing used to reach the virtualized software services even as the virtualized software services move to different network locations and physical locations. The example implementations herein thus can provide enhanced migration of software services, such as virtual machines or applications, from one host to another with reduced downtime or interruption.

In one example implementation, a method includes establishing a first instance of a software service in a first network namespace of a first virtualized environment configured to use block devices to emulate main memory and a data storage device for the software service. The method includes periodically synchronizing contents of the block devices to one or more files to reflect the main memory and the data storage device and pre-migrating the one or more files to a migration storage location. Responsive to a migration trigger event, the method includes initiating a migration operation to establish a second instance of the software service in a second network namespace of a second virtualized environment. The migration operation can include directing the second instance of the software service to reference the migration storage location to resume a state of the first instance, transferring un-migrated contents of the block devices for the first instance to block devices of the second instance, and migrating network addressing properties of the first instance such that a client node retains destination network address associated with the first instance to communicate with the second instance.

In another example implementation, a system includes a first virtualized environment comprising a first instance of a software service in a first network namespace, and configured to provide block devices that emulate main memory and a data storage device for the software service and periodically synchronize contents of the block devices to one or more files to reflect the main memory and the data storage device. The system also includes a migration element configured to pre-migrate the one or more files to a migration storage location, and responsive to a migration trigger event, transfer un-migrated contents of the block devices for the first instance for delivery to a second instance of the software service established in a second network namespace of a second virtualized environment, and migrate network addressing properties of the first instance such that a client node retains destination network address associated with the first instance to communicate with the second instance.

In yet another example implementation, an apparatus includes a processing system operatively coupled with one or more computer readable storage media, and program instructions stored on the one or more computer readable storage media. Based at least on being read and executed by the processing system, the program instructions direct the processing system to at least establish a first virtualized environment comprising a first instance of a software service in a first network namespace, the first virtualized environment configured to provide block devices that emulate main memory and a data storage device for the software service and periodically synchronize contents of the block devices to one or more files to reflect the main memory and the data storage device. The program instructions further direct the processing system to perform migration operations configured to pre-migrate the one or more files to a migration storage location, and responsive to a migration trigger event, transfer un-migrated contents of the block devices for the first instance for delivery to a second instance of the software service established in a second network namespace of a second virtualized environment, and migrate network addressing properties of the first instance such that a client node retains destination network address associated with the first instance to communicate with the second instance.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
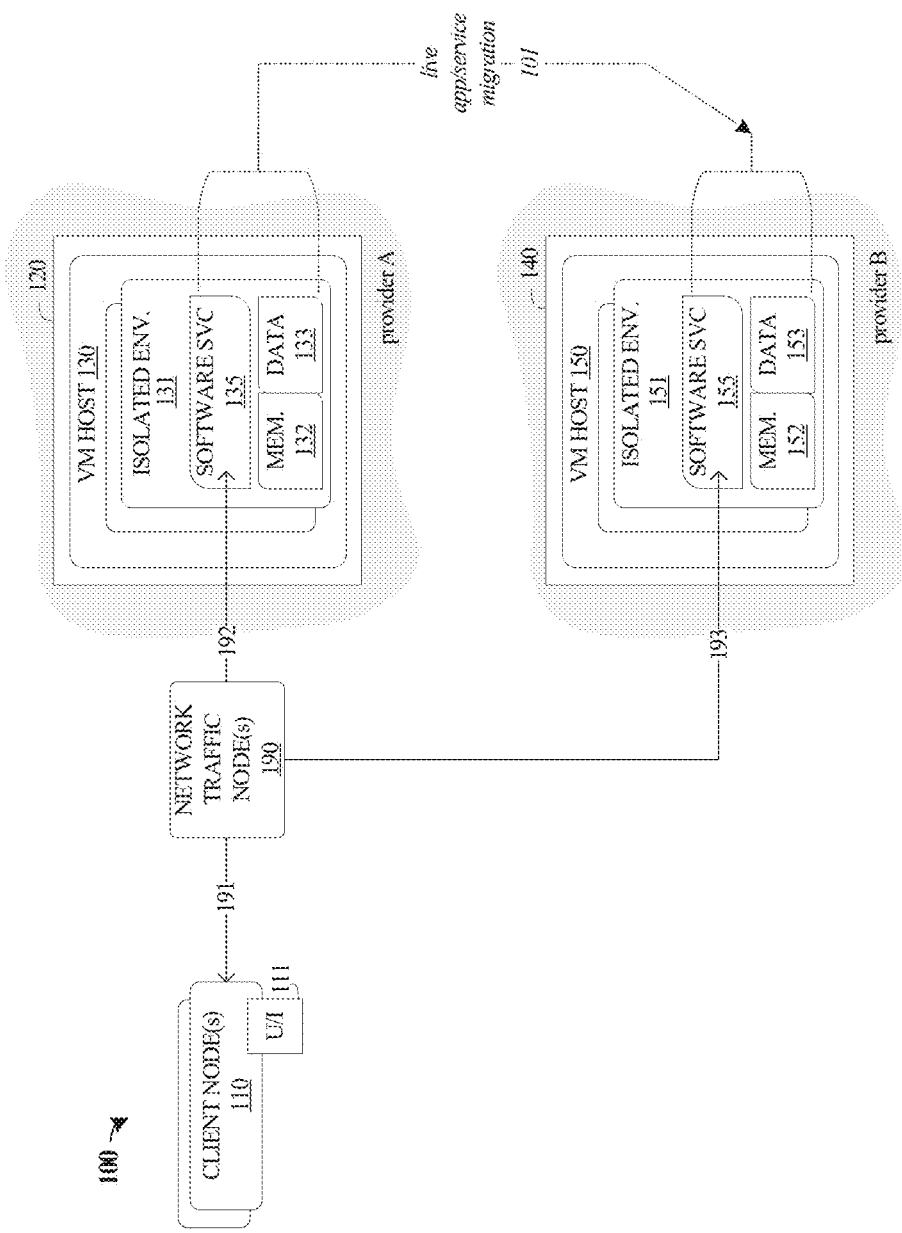
FIG. 1 illustrates an example system with an application/service migration in an implementation.

Migration of virtualized software services can involve moving remote resources, such as virtualized software components, from one host to another. When migration is performed on actively used resources, migration can include targeted goals of reducing service disruptions and downtime to served nodes. Provided herein are various enhancements for reduced downtime migration of virtualized software services across different instantiations, which may include real-time migration over different cloud/server providers and platforms, physical locations, network locations, and across different network routing elements. The example implementations herein thus can provide enhanced migration of software services (such as virtual machines, virtualized containers, or virtualized applications) from one host to another with reduced downtime and service interruptions.

Various techniques have been developed for accessing and synchronization of remote resources over network links, such as third-party databases, file synchronization services, custom application programming interfaces (APIs), or bespoke synchronization protocols. Current solutions for accessing, synchronization, and migration of resources over a network are characterized by application-specific protocols and interfaces, which result in fragmentation and barriers to adoption. A common technique is using an API in the Linux module userfaultfd, a user-space mechanism for handling paging and memory tracking. The examples herein can address problems and shortcomings of existing techniques and use of userfaultfd, in part, by presenting a universal approach that enables direct operation on a memory region, circumventing the need for custom-built solutions. This can provide for a solution that is suitable for both local area network (LAN) and wide area network (WAN) environments, among others, by using an approach based on block devices in user space with background push and pull mechanisms. The examples herein can provide a unified API that enables mounting and migration of nearly any state over a network accompanied by manageable changes to existing applications.

Some examples herein can employ the open-source r3map (remote mmap) library, but the examples are not limited to such libraries. Particularly, mmap is a Linux system call, used for mapping files or devices into memory, enabling a variety of tasks like shared memory, file I/O, and fine-grained memory allocation. Mmap can create an operational arrangement with a direct memory mapping between a file and a region of memory. This arrangement means that read operations performed on the mapped memory region directly correspond to reading the file and vice versa, enhancing efficiency as the amount of expensive context switches can be reduced (i.e., more efficient read or write system calls). A significant advantage of mmap is its ability to do zero-copy operations. In practical terms, this means that data can be accessed directly as if it were positioned in memory, eliminating the need to copy it from a data storage device (e.g., disk) first. This direct memory access saves time and reduces processing requirements, offering substantial performance improvements. The enhanced migration techniques discussed herein can be categorized into two main types or phases, namely pre-copy migration and post-copy migration.

Pre-copy migration can correspond to a "run-while-copy" nature, meaning that copying of data from an initial host (source host) to a destination host occurs concurrently while the target software service continues to operate. This is also applicable in a generic migration context where other software service state is being updated. In the case of a virtualized software service, such as a VM, the pre-copy migration procedure can start with transferring an initial state of a memory of a VM from an initial host to a destination host. During this operation, if modifications occur to any chunks of data, these chunks are flagged as dirty. These dirty chunks of data are then transferred to the destination until only a threshold amount remains, namely an amount small enough to stay within the allowed maximum downtime criteria corresponding to a transfer time of the remaining chunks from the initial host to the destination host. After this, the VM is suspended at the initial host, enabling the synchronization of the remaining chunks of data to the destination without having to continue tracking dirty chunks. Once this synchronization process is completed, the VM is resumed at the destination host. This pre-copy migration process is discussed herein is reliable, especially in instances where there might be network disruption during synchronization. For instance, at any given point during migration, the VM is available in full either at the initial host or the destination host. A limitation to this approach however is that, if the VM or application changes too many chunks on the initial host during migration, the process might not meet the maximum acceptable downtime criteria. Maximum acceptable downtime is also inherently restricted by the available round-trip time (RTT) between the initial host and the destination host.

Post-copy migration is an alternative live migration approach. While pre-copy migration operates by copying data before halt of a VM, post-copy migration immediately suspends the VM operation on the initial host and resumes it on the destination host, with only a minimal subset of the VM data. During this resumed operation on the destination host, whenever the VM attempts to access a chunk of data not initially transferred during the move, a page fault arises. A page fault, in this context, is a type of interrupt generated when the VM tries to read or write a chunk that is not currently present on the destination host. This triggers the VM system to retrieve missing chunks from the initial host, enabling the VM to continue its operations. One advantage of post-copy migration is that it eliminates the necessity of re-transmitting chunks of "dirty" or changed data before hitting a maximum tolerable downtime. This process can thus decrease this factor and also reduce the amount of network traffic between initial host and destination host. Despite this benefit, post-copy migration could also potentially lead to extended migration times as a consequence of its fetch-on-demand model for retrieving chunks. This is because fetch-on-demand can be highly sensitive to network latency and round-trip time (RTT). Unlike the pre-copy model, this also means that the VM is not available in full on either the initial host or the destination host during migration, requiring potential recovery solutions if network connectivity is lost during the process.

Turning now to the Figures which illustrate various aspects of example implementations, FIG. 1 is presented. FIG. 1 illustrates system 100 comprising one or more client nodes 110 which can communicate with one or more host nodes 120 and 140 over associated network links 191-193, and network traffic node(s) 190. Various networks, local area networks (LANs), wide area networks (WANs), and other arrangements can be included with any among links 191-193. One or more control nodes or command elements might be included to initialize software services and initiate migration operations, and portions of these control nodes or command elements can included in client nodes, host nodes, or separate nodes. Although separate control nodes are omitted from FIG. 1, further Figures illustrate examples of such elements.

Host node 120 executes an initial instance or source instance of a software application or software service, illustrated as software service 135 within isolated environment 131 of virtual machine (VM) host 130. Host node 140 executes a migrated instance or destination instance of the software application or software service, illustrated as software service 155 within isolated environment 151 of virtual machine (VM) host 150. Software applications or software services, such as software services 135/155 and other applications and services discussed herein, are referred to herein as "software services" for clarity. However, this terminology does not limit the type of software or application represented in the Figures.

In operation, client node 110 can communicate with an initial instance of software service 135 executed at host node 120. A migration process can occur which migrates software service 135 from an initial instance at host node 120 to software service 155 as a subsequent migrated instance at host node 140. As such, software service 155 can thus be conceptualized as a continuation of the initial instance of software service 135 at a different location, server, hardware set, execution environment, or other arrangement. Various data and state information is migrated, such that software service 135 can resume execution as software service 155 without interruption or substantial interruption to client node 110. This migration process can be referred to as a live migration, shown by operation 101 in FIG. 1. A "live" or "real-time" migration occurs as software service 135 continues to execute up until a migration event, and then resumes the execution state after migration completes—all the while client node 110 is being served by software service 135/155. Non-live migrations can also be applicable to the examples herein, such as when a client-service connection is halted or broken before migration, and a new connection or service is then instantiated after migration.

Figure 2:
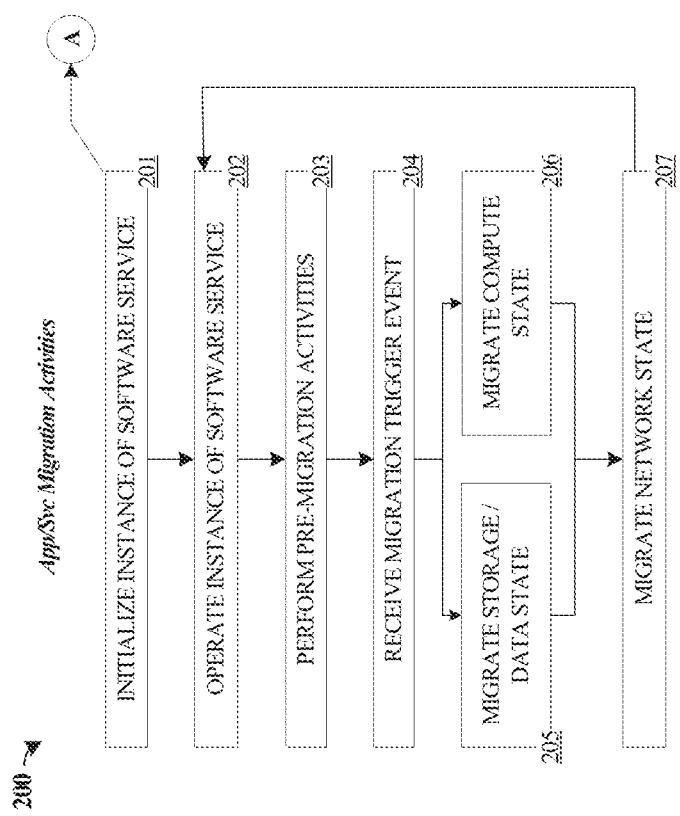
FIG. 2 illustrates example operations for application/service migration in an implementation.
Figure 4:
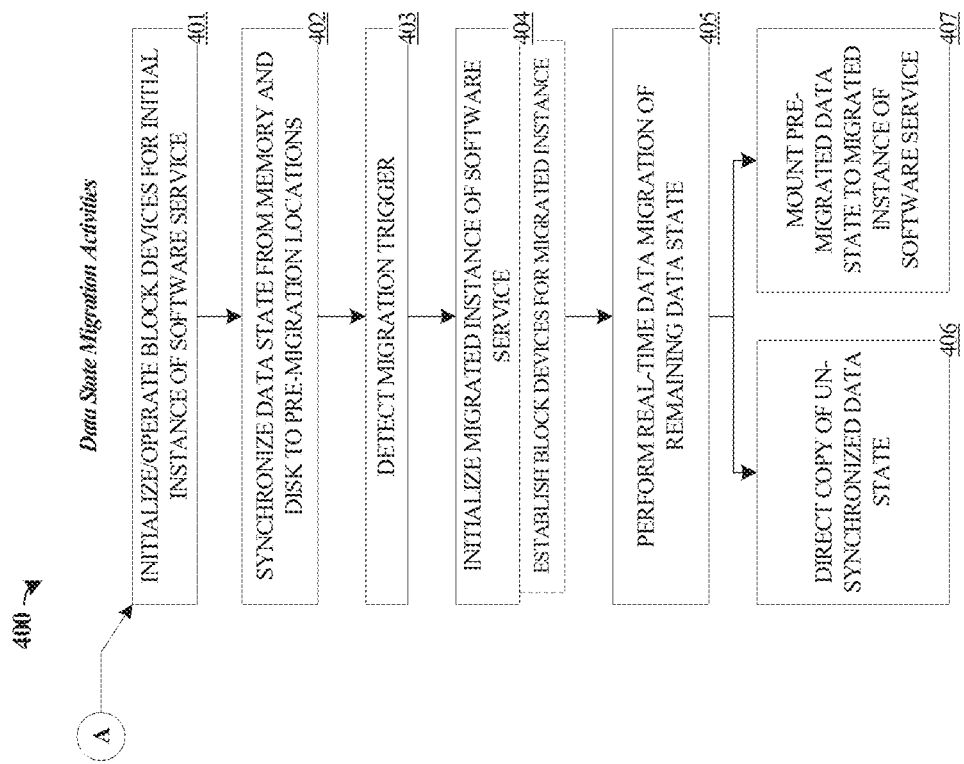
FIG. 4 illustrates example operations for data/state migration elements of an application/service in an implementation.

To perform migration operation 101, FIG. 2 is presented listing example operations 200. Optionally, point 'A' in FIG. 2 can connect operationally to other Figures, such as FIGS. 4, 6, and 8. In operation 201, host node 120 instantiates an initial instance of a software service. As shown in FIG. 1, software service 135 is initially executed at host node 120 within isolated environment 131 as a part of a virtualized environment, e.g., VM host 130. As a part of the instantiation, various emulated or virtualized data storage and handling elements can be included, such as a data storage device and a main memory device to support a virtualized processor device that executes software service 135. Data storage element 133 ("data") can act as a disk drive, solid state drive, or other mass data storage device. Main memory element 132 ("mem.") can act as a main memory device or random-access memory (RAM) for a virtualized processor for VM host 130. As software service 135 executes and otherwise operates (operation 202), contents of both memory element 132 and data element 133 are updated and/or changed. This operation of software service 135 can include providing services to client node 110, such as web services, data services, processing services, media content services, or other services which may include display of various content and user interaction via user interface 111 of client node 110.

At some point during the operation of software service 135, a migration might be desired to move the initial instance of software service 135 to another hardware device, server system, geographical location, cloud data services provider, data center, or other different physical or logical location. Responsive to this intent to migrate, pre-migration activities might be triggered, or these pre-migration activities might be performed on an ongoing basis once software service 135 is initialized. In operation 203, these pre-migration activities can be performed by VM host 130 or a separate control entity (not shown, see examples for node 520, node 770, and system 1000 below), which can include pre-migrating data and various state (such as execution state or virtual environment state) associated with software service 135, as well as identifying possible locations for the migration to land.

Among the pre-migration activities, data stored by memory element 132 and data element 133 can be synchronized to a storage location separate from host 120, such as over a network connection to a remotely located data storage system. This synchronization can occur periodically or responsive to changes made to the contents of memory element 132 and data element 133, including combinations thereof. Thus, pre-migration data images might be stored off-site from host 120 to be ready for any future migration activities.

To enable these synchronization activities, such as for memory element 132 which typically contains active execution data and pages for software service 135 (as opposed to long-term data storage or paged-out data in data element 133), various techniques can be applied. One example includes pull-based data synchronization with UNIX/Linux userfaultfd functions in a scenario where pre-migration is not employed. Thus, the userfaultfd functions allow for the implementation of a post-copy migration scenario. In this setup, a data storage region is created on a remote storage system. A migrated software service can then start to read from this remote region after being resumed and page faults can be triggered by normal operation, which are resolved by fetching the relevant data offset from the remote region. However, userfaultfd has drawbacks which limit its functionality for pre-migration of software service 135. Instead, other enhanced examples discussed herein can employ UNIX/Linux mmap functions to provide pre-migration and other migration activities.

Advantageously, mmap functions can provide for pre-migration scenarios and push-based synchronization. Mmap allows mapping a main memory region to a file, such that main memory (e.g., memory element 132) is implemented by this file. Mmap can be used can be used to synchronize data/state of an actively executed software service (e.g., an application) to a data storage region created on a storage system comprising the file. Since the main memory of software service 135 is mapped to a file, and likewise the storage region stores the file, when writes happen to the storage region. Writes are detected and copied to a remote data storage system, establishing at least a portion of a pre-copy (pre-migration) scenario. In some examples, writes done to a mmap linked storage region are not immediately written to the underlying file, since the kernel still might employ caching on a mmap-ed region in order to speed up reads/writes. In such examples, an msync syscall can be used, which works similarly to the sync syscall by flushing any remaining changes from the cache to the underlying file. Instead of using inotify or a similar event-based system to track changes, a polling system can be used. This has drawbacks, namely latency and computational load.

Another example using an mmap-based approach for both pre- and post-copy migration is to mmap a block device instead of a file. This block device can be provided through a variety of APIs, most notably a Linux network block device (NBD). By providing a NBD device through a kernel NBD client, the NBD device can be connected to a remote NBD server, which hosts the resource as a memory region. Reads/writes from/to the mmap-ed memory region are resolved by the NBD device, which forwards it to the client, which then resolves them using the remote server. This approach does not actually copy the memory region to the destination host, but rather comprises a mount of a remote memory region over the NBD protocol. A benefit of using mmap on such a block device (NBD) instead of a file on a custom file system (as in the previous example) is reduced complexity. For the use case of memory synchronization, not all the features provided by a full file system are required, which means that the implementation of an NBD server and client, as well as the accompanying protocols, is significantly less complex and can also reduce the overhead of the system.

Thus, through one of the various techniques mentioned above, a pre-migration process ensures that live execution data and/or application state for software service 135 is synchronized to a file or block device, which can then further be synchronized to a remote storage system over a network link or other remote link. At some point during operation of software service 135, a migration operation is triggered (operation 204). The migration can be triggered automatically due to various criteria or manually with operator intervention, and signaled to VM host 130 over a network link, API, or other remote signaling. Responsive to the migration trigger, VM host 150 can be instantiated at host 140, which can then establish isolated environment 151. Software service 155 can be instantiated within isolated environment 151, and data/state corresponding to software service 135 can be employed for software service 155 to resume operations of software service 135. In this manner, software service 155 comprises a migrated instance of software service 135. In addition to data/state migrations, network properties and connections can be migrated, and this network migration will be discussed in more detail in later Figures.

With regard to data and state migration, operations 205 and 206 relate to post-copy migration of data and state (associated with execution of software service 135) to a migrated instance comprising software service 155. This includes halting or stopping the initial instance of the software service to prevent further changes to data/state and copying an incremental update to the data/state not already synchronized during pre-migration activities. These incremental updates are typically small in size, such that the time to copy or synchronize to a migrated instance of the software service is on the order of hundreds of milliseconds (ms). Once the incremental transfers occur, then the migrated instance of the software service (e.g., software service 155) can resume operation using the data/state from both the incremental updates (post-copy migration) and pre-migrated data (pre-copy migration). Once initiated at host 140, software service 155 can continue operation of software service 135 using the migrated data/state and network properties. The two-prong pre/post migration approach ensures a fast transition among instances of the software service and provides uninterrupted service to client node 110.

In addition to the data/state migration, operation 207 includes migration of network state, connections, or properties from the initial instance of the software service (e.g., software service 135) to the migrated instance of the software service (e.g., software service 155). This migration of network state includes informing network routing or handling elements to reference new network addressing properties for software service 155 which are updates to network addressing properties from software service 135. Specifically, TCP/IP addressing for ingress and/or egress traffic nodes that handle inbound/outbound traffic between client node 110, software service 135, and various network interfacing elements of host 120, VM host 130, and isolated environment 131 is updated such that client node 110 maintains the same network addressing used to access the software service across both the initial instance and the migrated instance. Thus, client node 110 need not be aware of the migration process and can receive uninterrupted service with respect to the software service without regard to if hosted at host 120 or host 140.

Returning now to a discussion on the elements of FIG. 1, client node(s) 110 comprise various computing nodes having user interface elements, such as U/I 111, network interface controllers and network interfacing elements, data processing and storage elements, and other various components. Examples include computers, servers, tablet computing devices, media streaming devices, smartphone devices, laptops, desktop computers, gaming consoles, end user devices, customer equipment, mobile Internet appliance, media player, endpoint terminals, kiosk nodes, or other various computing devices, including combinations thereof. In some examples, client node(s) 110 execute software, such as operating systems, display drivers, and applications to display graphical content on a display screen. Client node(s) 110 can include one or more CPUs or microprocessors and other processing circuitry that retrieves and executes software, and any number of end user applications, from an associated storage system. Each processing element can be implemented within a single processing device but can also be distributed across multiple processing devices or subsystems that cooperate in executing program instructions. Examples of each processing module include general purpose central processing units, application specific processors, and logic devices, as well as any other type of processing device, combinations, or variations thereof.

Network traffic node(s) 190 comprise one or more network routing, handling, traffic processing, and transport elements or equipment. Network traffic node(s) 190 can comprise ingress traffic nodes, egress traffic nodes, network routers/switches, network traffic caching nodes, and other equipment. Network traffic node(s) 190 can include various network switching circuitry to communicatively link individual network links to other network links based on network addressing, traffic patterns, network status, or other traffic properties. In one example, network traffic node(s) comprise Transmission Control Protocol/Internet Protocol (TCP/IP) routing and control elements, which can include Ethernet switching and routing elements corresponding to wired or wireless connections, which can refer to any of the various network communication protocol standards and bandwidths available, such as 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, 800 GbE, Fifth Generation New Radio (5GNR), Long Term Evolution (LTE), Institute of Electrical and Electronic Engineers (IEEE) 802.11 (Wi-Fi), or other various wired and wireless formats and speeds.

Hosts 120 and 140 each comprise computing platforms which can host various software payloads for execution, such as applications, software services, user/client payloads, software workloads, virtual machines, virtualization environments, containers, or other software elements. Hosts 120 and 140 comprise hardware elements including processing elements, data storage and memory elements, network interfaces, and optional user interface elements. Examples of hosts 120 and 140 include servers, blade servers, computers, elements of a distributed computing system, or other computing systems. Typically, hosts 120 and 140 will each include a motherboard or other system circuit board having a central processing unit (CPU) coupled thereto along with memory devices, such as random-access memory (RAM) or dynamic RAM (DRAM). The CPU can be a component in a processing system formed from among one or more microprocessor elements. Various peripheral devices can physically couple to hosts 120 and 140 via corresponding links within an enclosure or chassis. These peripheral devices can include graphics cards housing graphics processing units (GPUs), data storage drives using various computer-readable media, network interface controllers (NICs) having physical layer elements to couple to network links (e.g., Ethernet), or other devices including user interface devices.

Hosts 120 and 140 also include various software which is executed by one or more physical processors and operating systems. Software typically includes host operating systems, user applications, device drivers, user data, hypervisor software, telemetry software, or other various software elements. The hardware and host software elements (e.g., host operating system) can be isolated or virtualized from payload software elements by a virtualization system, which can include one or more virtual machines (VMs), virtualized environments, or containers, among other virtualized arrangements, which abstract the physical hardware and host software elements from the payload/virtualized software. Among the elements which provide such functionality include hypervisors or other software elements that virtualize and apportion hardware resources among the payloads presently executing. As noted, these resources can include CPUs, GPUs, network interfaces, RAM, mass storage drives (e.g., hard disk drives (HDDs) or solid-state drives (SSDs)), or other hardware elements.

Although not required, hosts 120 and 140 are also each associated with a different provider in this example. Specifically, host 120 is associated with provider A and host 140 is associated with provider B. Providers can correspond to different service providers, cloud computing providers, hosting companies, service platforms, terms of service regions/agreements, or other arrangements. In some examples, providers can correspond to the same entity but having different sets of physical hardware dedicated to different service levels or qualities of service, such as different tiers of service for different pricing, bandwidth limits, processing limits, or other criteria. Thus, migrating a software service from a first provider to a second provider might change physical locations within a hosting environment, logical locations within a virtualized environment, geographic locations to different server facilities, higher/lower terms of service or quality of service limits, different network locations with different network latencies, locations, or bandwidths, from stationary to mobile/moving arrangements, from home networks to roaming networks, or other changes which prompt or trigger a migration event.

VM host 130 and 150 comprise virtualized environments each including at least one among a virtual machine, operating system level virtualization, application-level virtualization, system virtual machine, process virtual machine, container, or containerized environment which executes on hardware provided by host nodes 120 and 140. VM host 130 and 150 can instantiate any number of instances of software services, such as software services 135 and 155. These software services might comprise further virtualized environments nested within the virtualized environment of VM host 130 and 150 (e.g., nested virtual machine, operating system level virtualization, application-level virtualization, system virtual machine, process virtual machine, container, or containerized environment). Isolated environments 131 and 151 can isolate a network namespace within VM host 130 and 150 for software services 135 and 155. This can include isolating more than just network properties, and can be configured to isolate software services 135 and 155 from differences in hardware clock speeds or processor speeds and other hardware aspects from virtualized instance of the software services, provide consistent network addressing for virtualized instances of software services across various machines/locations and migrations.

Also, interconnection links and communications carried by such links in FIG. 1 (and other Figures herein), can be encrypted. This encryption can take various forms, including data encryption of data payloads, packet encryption, encapsulation of packets and encryption thereof, encryption of links and traffic carried thereon, and other encryption techniques. These techniques can include end-to-end encryption, various authentication and key exchange technologies, asymmetric encryption, symmetric encryption, AES (Advanced Encryption Standard) encryption types, Data Encryption Standard (DES) types, hashing, public-key encryption, private-key encryption, and various other types or techniques of encrypting data, packets, links, interfaces, network stacks, and the like.

Figure 3:
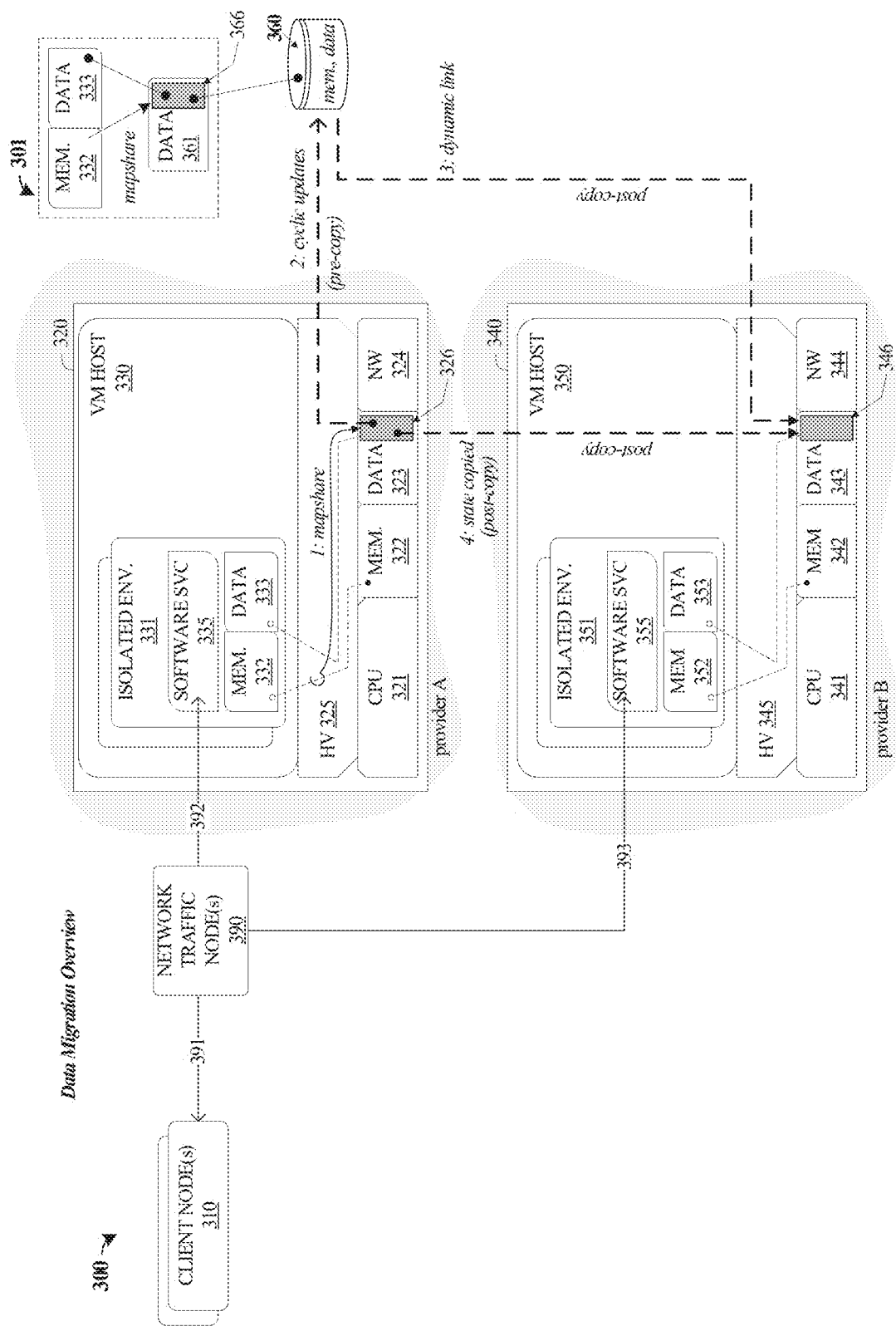
FIG. 3 illustrates an example system with migration of data/state of an application/service in an implementation.

Turning now to FIG. 3, a further system illustration is provided detailing data migration and state migration for a software service, such as a virtual machine, container, or other virtualized software element which may comprise an application, software service, software server element, or other software element. FIG. 3 illustrates system 300 comprising one or more client nodes 310 which can communicate with one or more host nodes 320 and 340 over associated network links 391-393, and network traffic node(s) 390. Various networks, local area networks (LANs), wide area networks (WANs), and other arrangements can be included with any among links 391-393. One or more control nodes or command elements might be included to initialize software services and initiate migration operations, and portions of these control nodes or command elements can included in client nodes, host nodes, or separate nodes. Although separate control nodes are omitted from FIG. 3, further Figures illustrate examples of such elements.

Also included in FIG. 3 is data storage system 360. Data storage system 360 can be configured to store pre-migrated data/state for software services, and provide stored data/state to migrated instances. Data storage system 360 includes data storage unit 361 which can store both data and state associated with instances of software services, such as corresponding to main memory contents and mass storage device contents of memory element 332 and data storage element 333 of the initial instance of software service 335. Data storage system 360 can communicate with network interface elements of hosts 320 and 340 over one or more network links (not shown). Although shown as a remote or off-site data storage system in FIG. 3, portions of data storage system 360 might instead be included among hosts 320 or 340, or other locations.

Host node 320 executes an initial instance or source instance of a software application or software service, illustrated as software service 335 within isolated environment 331 of virtual machine (VM) host 330. Host node 340 executes a migrated instance or destination instance of the software application or software service, illustrated as software service 355 within isolated environment 351 of virtual machine (VM) host 350. Host 320 includes hypervisor (HV) 325 and host 340 includes HV 345. These hypervisors provide environments for virtual machines (VMs), containers, or other virtualized elements to operate and share underlying physical computing resources, such as CPUs, GPUs, RAM/memory, network interfaces, and mass storage devices (SSDs/HDDs) of a corresponding server. HVs 325 and 345 are representative of a virtualized execution system, which includes virtualized user spaces having individual operating systems and applications, such as for software services 335/355. As seen in FIG. 3, host 320 includes physical hardware comprising CPU 321, main memory (RAM) 322, data storage device (data) 323, and network interface controller (NW) 324, among other elements. Likewise, host 340 includes physical hardware comprising CPU 341, main memory (RAM) 342, data storage device (data) 343, and network interface controller (NW) 344, among other elements.

In operation, client node 310 can communicate with an initial instance of software service 335 executed at host node 320. A migration process can occur which migrates software service 335 from an initial instance at host node 320 to software service 355 as a subsequent migrated instance at host node 340. As such, software service 355 can thus be conceptualized as a continuation of the initial instance of software service 335 at a different location, server, hardware set, execution environment, or other arrangement. Various data and state information is migrated, such that software service 335 can resume execution as software service 355 without interruption or substantial interruption to client node 310. Software service 335 can continue to execute up until a migration event, and then resume the execution state after migration completes—all the while client node 310 is being served by one among software services 335/355.

To perform a migration operation, FIG. 3 includes example copy or migration operations with respect to data storage system 360. These operations are further described in example operations 400 of FIG. 4. In operation 401, host node 320 instantiates an initial instance of a software service. As shown in FIG. 3, software service 335 is initially executed at host node 320 within isolated environment 331 as a part of a virtualized environment, e.g., VM host 330. As a part of the instantiation, various emulated or virtualized data storage and handling elements can be included, such as a data storage device and a main memory device to support a virtualized processor device that executes software service 335. Data storage element 333 ("data") can act as a disk drive, solid state drive, or other mass data storage device. Main memory element 332 ("mem.") can act as a main memory device or random-access memory (RAM) for a virtualized processor for VM host 330. As software service 335 executes and otherwise operates, contents of both memory element 332 and data element 333 are updated and/or changed. This operation of software service 335 can include providing services to client node 310, such as web services, data services, processing services, media content services, or other services.

At some point during the operation of software service 335, a migration might be desired to move the initial instance of software service 335 to another hardware device, server system, geographical location, cloud data services provider, data center, or other different physical or logical location. Responsive to this intent to migrate, pre-migration activities might be triggered, or these pre-migration activities might be performed on an ongoing basis once software service 335 is initialized. In operation 402, these pre-migration activities can be performed by VM host 330 or a separate control entity (not shown), which can include pre-migrating data and various state (such as execution state or virtual environment state) associated with software service 335, as well as identifying possible locations for the migration to land.

Among the pre-migration activities, data stored by memory element 332 and data element 333 can be synchronized to a storage location separate from host 320, such as over a network connection to data storage system 360. This synchronization can occur periodically or responsive to changes made to the contents of memory element 332 and data element 333, including combinations thereof. To enable these synchronization activities, such as for memory element 332 which typically contains active execution data and pages for software service 335 (as opposed to long-term data storage or paged-out data in data element 333), various techniques can be applied.

FIG. 3 employs UNIX/Linux mmap and block device functions to provide pre-migration and other migration activities. Mmap functions can provide pre-migration and push-based synchronization. Mmap allows mapping a main memory region to a file, such that main memory (e.g., memory element 332) is implemented by this file. Mmap can be used to synchronize data/state of an actively executed software service (e.g., an application) to a data storage region created on a storage system comprising the file. The main memory of software service 335 is mapped to a file, as shown for label "1: mapshare" in FIG. 3. Storage region 326 of data storage device 323 stores the file. In some examples, writes done to a mmap linked storage region are not immediately written to the underlying file, since the kernel still might employ caching on a mmap-ed region in order to speed up reads/writes. In such examples, an msync syscall can be used, which works similarly to the sync syscall by flushing any remaining changes from the cache to the underlying file. Instead of using inotify or a similar event-based system to track changes, a polling system can be used. This has drawbacks, namely latency and computational load.

In addition to using an mmap-based approach for both pre- and post-copy migration, a block device can be employed to host the mmap file. This block device can be provided through a variety of APIs, most notably a Linux network block device (NBD). By providing an NBD device through a kernel NBD client, the NBD device can be connected to a remote NBD server, which hosts the resource as a memory region. In FIG. 3, storage region 326 of data storage device 323 comprises an NBD and includes at least a file implementing or synchronous with memory element 332. Writes to block device 326 are detected and copied to a remote data storage system, namely data storage system 360 in view 301, which is also shown by label "2: cyclic updates (pre-copy)" in FIG. 3. Data storage system 360 hosts an NBD in storage region 366 in data storage device 361, establishing at least a portion of a pre-copy (pre-migration) copy of block device 326. As shown, block device 326 can house data for both memory element 332 and data storage element 333, although some examples might include more than one block device. Thus, a pre-migration process ensures that live execution data and/or application state for software service 335 is synchronized to a file or block device, which can then further be synchronized to a remote storage system (360) over a network link or other remote link.

At some point during operation of software service 335, a migration operation is triggered (operation 403). The migration can be triggered automatically due to various criteria or manually with operator intervention, and signaled to VM host 330 over a network link, API, or other remote signaling. Responsive to the migration trigger, VM host 350 can be instantiated (operation 404) at host 340, which can then establish isolated environment 351. Software service 355 can be instantiated within isolated environment 351, and data/state corresponding to software service 335 can be employed for software service 355 to resume operations of software service 335. In this manner, software service 355 comprises a migrated instance of software service 335. In addition to data/state migrations, network properties and connections can be migrated, and this network migration will be discussed in more detail in later Figures.

In FIG. 3, once software service 355 is instantiated in isolated environment 351 of VM host 350, then a real-time data migration of pre-copy and post-copy data/state can occur (operation 405). For pre-copy data/state (operation 406), a link to NBD in storage region 366 can be established for software service 355. Label "3: dynamic link" in FIG. 3 shows this initial linking or mapping of the NBD in storage region 366 to an NBD in storage region 346 of data storage device 343 of host 340. In this manner, data can be read or served 'live' by software service 355 from the NBD in storage region 366 over a network link until a migration has completed. In some examples, client requests can be served by data in NBD in storage region 366 through software service 355. For post-copy data/state (operation 407), a final record of the data/state of software service 335 is copied to the NBD in storage region 346 in label "4: state copied (post-copy)" in FIG. 3. This post-copy data includes previously un-migrated contents of the NBD in storage region 326. Once all data/state has been transferred, mapped, or linked for use by software service 355 with respect to the NBD in storage region 366, then data/state of software service 335 can be considered migrated to software service 355.

Further terminology can be employed for the various elements of FIG. 3. For example, the NBD in storage region 326 might be referred to as a seeder, and the NBD in storage region 366 referred to as a leecher, or other terminology. Connections can be established among the seeder and leecher, and changes can be tracked at the seeder which are echoed or synchronized unidirectionally to the leecher, using either a push or pull mechanism. For example, background 'pulls' might be employed to echo data in a delta- or de-duplicated manner from the seeder to the leecher. Upon migration, NBD in storage region 326 might be suspended from further changes, and a collection of unsynchronized changes (incrementally updated data chunks) or un-echoed changes can be tabulated and transferred to the migrated instance. These unsynchronized changes are typically small in size, such that the time to copy or synchronize to the new/migrated instance of the software service is on the order of ~200 ms. Once the incremental transfers occur, then the migrated instance of the software service (e.g., software service 355) can resume operation using the data/state from both the incremental updates (post-copy migration) and pre-migrated data (pre-copy migration). Once initiated at host 340, software service 355 can continue operation of software service 335 using the migrated data/state and network properties. The two-prong pre/post migration approach ensures a fast transition among instances of the software service and provides uninterrupted service to client node 310.

Thus, FIGS. 1-4 discuss various examples of migrating an execution workload, such as a software service, from one virtualized environment to another virtualized environment with reduced downtime or reduced interruption for client nodes. Among these examples includes implementations that establish a first instance of a software service in a first network namespace of a first virtualized environment configured to use block devices to emulate main memory and a data storage device for the software service. These examples can include periodically synchronizing contents of the block devices to one or more files to reflect the main memory and the data storage device and pre-migrating the one or more files to a migration storage location. Responsive to a migration trigger event, the examples can initiate a migration operation to establish a second instance of the software service in a second network namespace of a second virtualized environment. The migration operation can comprise directing the second instance of the software service to reference the migration storage location to resume a state of the first instance, transferring un-migrated contents of the block devices for the first instance to block devices of the second instance, and migrating network addressing properties of the first instance such that a client node retains destination network address associated with the first instance to communicate with the second instance.

The examples herein can produce a migration with reduced or minimized downtime, and this downtime can be further optimized by selecting an order in which data is migrated between nodes. For example, writes can be tracked in real-time (without affecting the write performance of the workload), and migration can be provided for the least-volatile blocks of memory first (and most volatile last), such that the amount of dirty data re-transferred is reduced or minimized. The data volatility can be tracked by recency of access, with thresholds established for recency of access/use/write/read to differentiate between most volatile and least volatile. Other metrics, thresholds, and data categorization can be employed. The data volatility can be assessed continuously or periodically, as well as before and during the migration. This can result in higher data transfer overall, but significantly reduces the overall time to complete a migration of the data after the corresponding VM is paused. Specifically, since only the 'most' volatile data needs to be transferred after pausing the VM, then the 'least' volatile data has already been transferred ahead of time.

Also, in the examples herein, a VM can be paused and migrated without moving the most volatile blocks of data. Those "most volatile" blocks can be left at the source host. The VM is then resumed on the destination host without those blocks being available locally. However, when the destination host attempts to read or write to those volatile blocks, those operations will succeed because the blocks are transferred just-in-time. This can lead to slightly higher latency for the first read at the destination host because some blocks/data are transferred just-in-time (future reads are local to the destination host). This can lead to slightly higher latency as well as for partial block writes (where part of a block is written), due to the need to fetch the full block first and then overwrite the partial areas locally at the destination host (future writes to the block do not have additional latency). The end result is that a VM does not need to be paused for much time—because the operations herein are not sending any disk or memory data, just state and some metadata which is comparatively small. The amount of time the VM is paused is the definition of downtime, so by keeping that close to 0, the examples herein are actively providing an enhanced reduced downtime migration.

Figure 5:
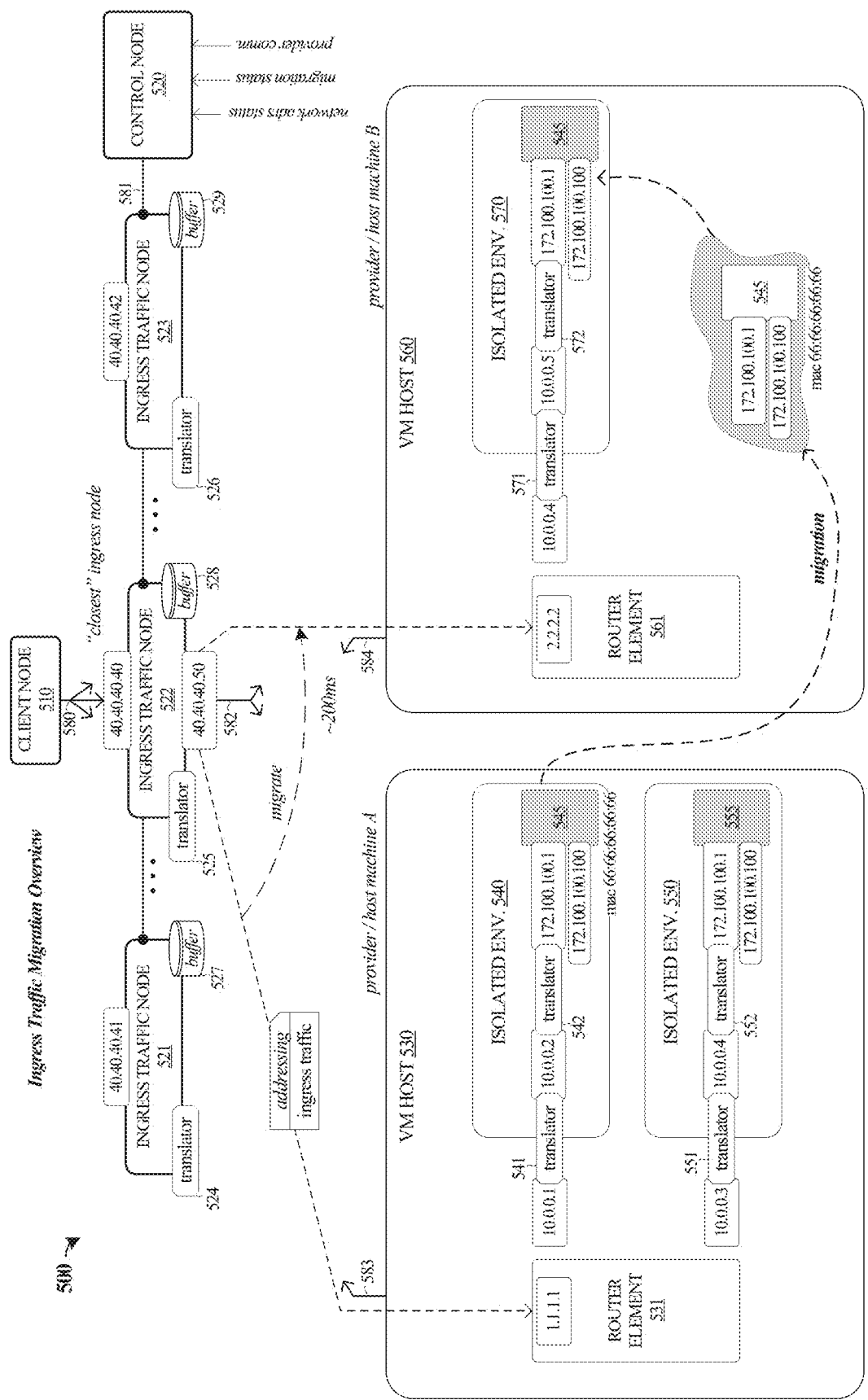
FIG. 5 illustrates example migration of ingress traffic handling in an implementation.
Figure 6:
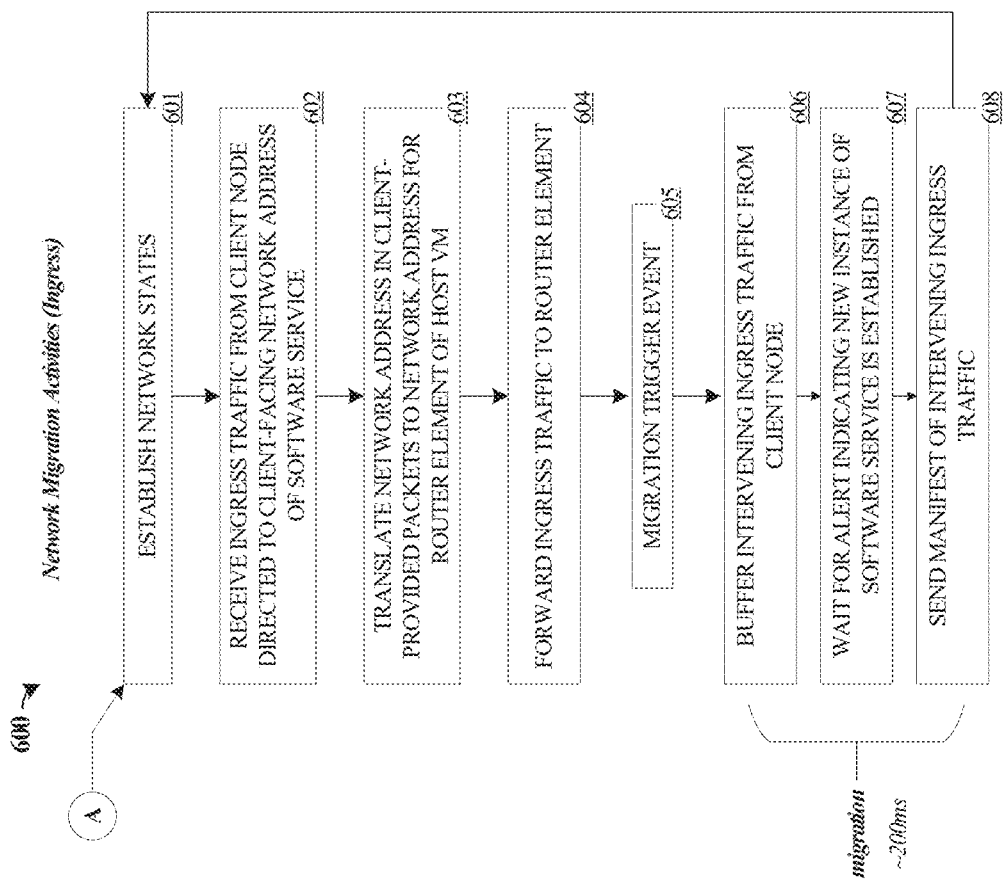
FIG. 6 illustrates example operations for migration of ingress traffic handling in an implementation.
Figure 7:
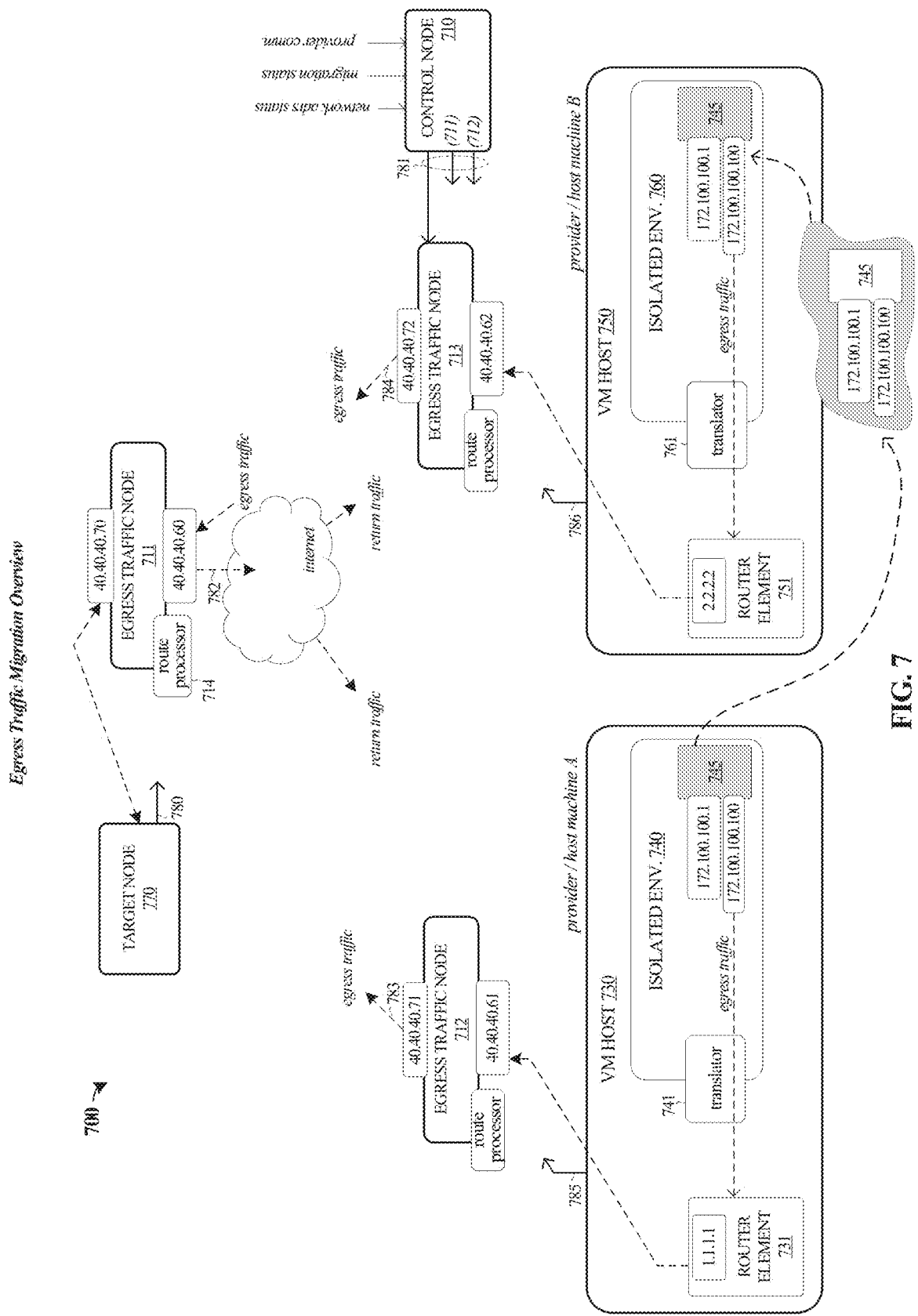
FIG. 7 illustrates example migration of egress traffic handling in an implementation.
Figure 8:
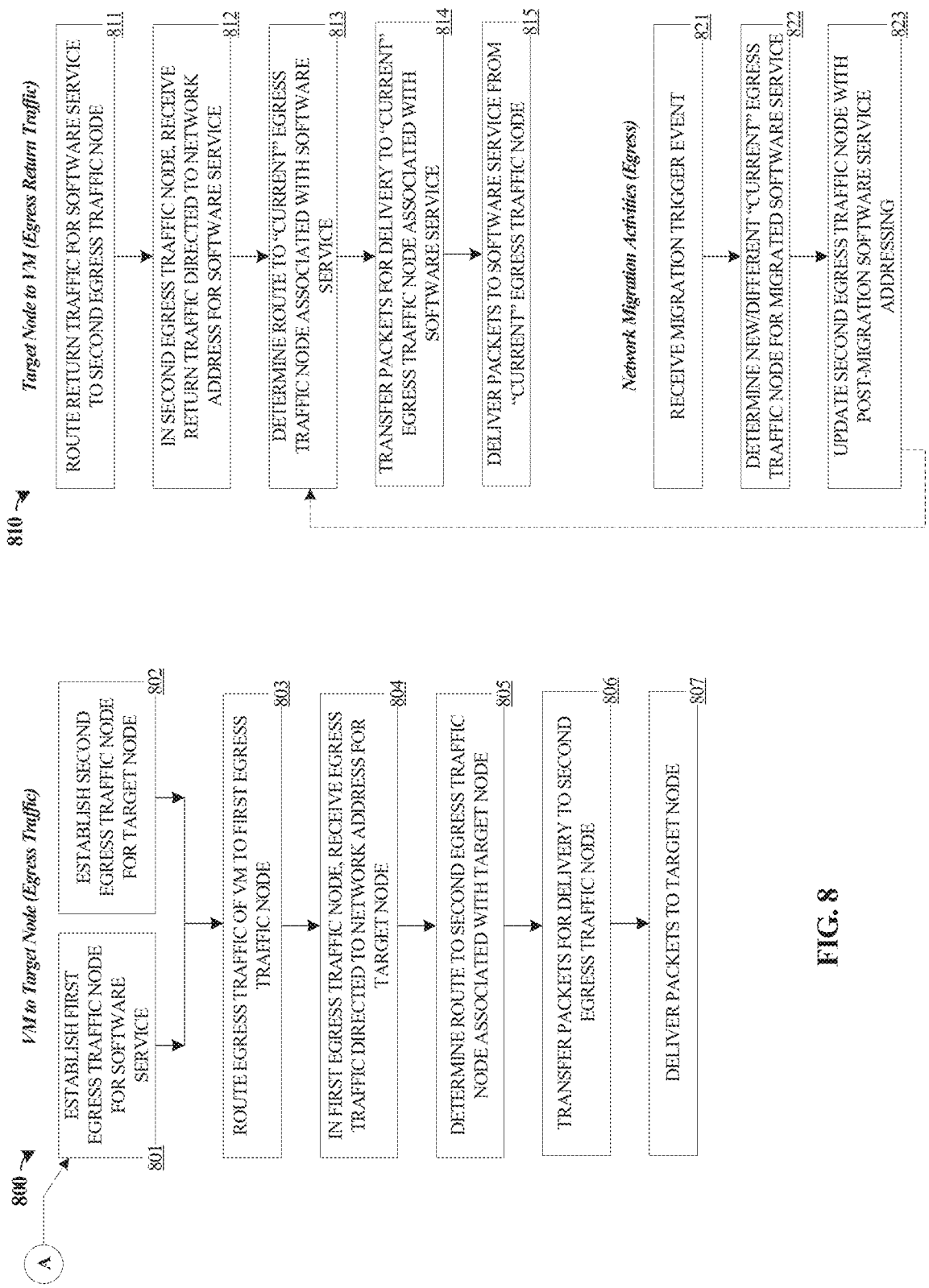
FIG. 8 illustrates example operations for migration of egress traffic handling in an implementation.

In addition to the data/state migration noted above, migration of network state can be performed for network connections or network properties from the initial instance of the software service (e.g., software service 335) to the migrated instance of the software service (e.g., software service 355). FIGS. 5 and 6 provide examples of ingress traffic routing and network migration, where ingress traffic relates to traffic transferred by a client node for delivery to a corresponding software service (and associated return traffic). FIGS. 7 and 8 provide examples of egress traffic routing and network migration, where egress traffic relates to traffic transferred by a software service for delivery to a third party, client node, or other application or service (and associated return traffic).

Turning now to FIG. 5, migration of network connections and network properties for a software service is shown in one example implementation. Specifically, FIG. 5 illustrates migration of ingress traffic routing for a software service migrating from a first instance to a second instance. Ingress traffic refers to network traffic transferred for delivery to a software service. This ingress traffic might be originated by a client node or other nodes that interface with a software service. To transfer such traffic, an originating node typically includes network addressing among packets or frames to reach the software service. This network addressing, as will be discussed below, is abstracted from an actual network address of a software service, which typically is instantiated within an isolated environment, such as a network namespace within a virtualized environment or virtual machine. By abstracting the network addressing for a software service, a client node can continue to communicate using the same network address to reach a software service both before and after migration of the software service from one instance to another instance.

One example of ingress traffic handling is shown in system 500 of FIG. 5. System 500 includes client node 510, control node 520, ingress traffic nodes 521-523, VM host 530, and VM host 560. Client node 510 can communicate with any among ingress traffic nodes 521-523 over network link 580. Control node 520 can communicate with any among ingress traffic nodes 521-523 over network link 581, shown in a simplified representation in FIG. 5. Ingress traffic nodes 521-523 can communicate with various nodes, such as with VM hosts 530 and 560 over associated network links, such as network link 582 shown for ingress traffic node 522. VM hosts 530 and 560 can communicate over network links 583 and 584 coupled to router elements 531 and 561. Router elements 531 and 561 can be virtualized network router elements corresponding to physical network interfaces (not shown) of host computing devices or host compute units.

Client node 510 comprises various computing nodes having user interface elements, network interfacing elements, data processing and storage elements, and other various components. Examples include those discussed above for client node(s) 110 above, such as various types of computing devices or media playback devices, although variations are possible.

Ingress traffic nodes 521-523 comprise one or more network routing, handling, traffic processing, and transport elements or equipment. Ingress traffic nodes 521-523 can include various network switching circuitry to communicatively link individual network links to other network links based on network addressing, traffic patterns, network status, or other traffic properties. In this example, ingress traffic nodes 521-523 include translator elements 524-526 and buffer elements 527-529. Translator elements 524-526 comprise network route translation elements, including software components, data processing elements, routing table storage elements, network router elements, and other components. Buffer elements 527-529 comprise data storage elements, such as memory elements, mass storage elements, SSDs, HDDs, RAM, or other data storage components capable of storing network traffic in the form of packets, frames, payloads, headers, addressing, and other portions of network traffic.

Control node 520 comprises control elements for instructing ingress traffic nodes 521-523 and VM hosts 530 and 560 with regard to the various operational scenarios described herein. Control node 520 can include one or more microprocessors and other processing circuitry that retrieves and executes software, and any number of control software applications, from an associated storage system. Each processing element can be implemented within a single processing device but can also be distributed across multiple processing devices or sub-systems that cooperate in executing program instructions. Examples of each processing module include general purpose central processing units, application specific processors, and logic devices, as well as any other type of processing device, combinations, or variations thereof. In FIG. 5, control node 520 can take inputs from various external elements and nodes, and perform various control operations based at least on these inputs.

As shown in FIG. 5, software service 545 is initially executed at a host node within isolated environment 540 as a part of a virtualized environment, e.g., VM host 530. Software service 555 within isolated environment 550 is also included within VM host 530, which might comprise another parallel instance of software service 545 that services other client nodes or other services/applications for client node 510. VM host 530 also includes router element 531 which comprises a virtualized router configured to route or otherwise handle network traffic between external network links/nodes and network elements internal to VM host 530, such as those for isolated environments 540 and 550. Furthermore, VM hosts 530 and 560 might further include virtualized environments within their own virtualized environments. These embedded, recursive, or nested virtualized environments can include those to instantiate software services 545 and 555. Thus, software services 545 and 555 can comprise a further virtualized environment nested within another virtualized environment (e.g., VM hosts 530 and 560), where the further virtualized environment has a network interface and instantiates a client-facing software service.

VM hosts 530 and 560 can be hosted by physical computing platforms, such as shown for hosts 120 and 140, although variations are possible. Thus, these physical computing platforms might include various hardware elements including processing elements, data storage and memory elements, network interfaces, and optional user interface elements. The hardware and host software elements (e.g., host operating systems) can be isolated or virtualized from payload software elements by a virtualization system, which can include one or more virtualized environments represented by isolated environments 540 and 550 in FIG. 5.

FIG. 5 shows various functional elements which are interconnected by network links. The actual network links are omitted from FIG. 5 for most of the functional elements, but are shown as exemplary links 580-584. Links 580-584 can comprise any type of network link formed from one or more physical links comprising electrical, optical, or wireless signaling layers. Various network protocols and traffic types can be carried by such links, such as TCP/IP or other similar protocols associated with various network stacks and transport/internet layers. The examples herein are not intended to limit the links to any particular protocol or network link type. Also, these network links can carry various frames, packets, datagrams, or other granular data representation, which can vary based on the exact link/protocol employed. Typically, addressing used for routing the traffic is included in a header portion of a packet or frame, with payload portions configured to carry data or other packets/frames with associated addressing.

Turning now to various operational scenarios for FIG. 5, operations 600 of FIG. 6 are presented. In operation 601, an initial instance of a software service is established, such as shown for software service 545 in isolated environment 540 of VM host 530. Along with instantiating software service 545 and various storage/memory elements discussed above, corresponding network interfaces and network states can be established. These network states include various network addressing, network properties of isolated environment 540, network routing tables, ingress/egress configurations, and other states and properties. In one example, ingress traffic nodes and router elements of the VM hosts receive network address configurations from control node 520, where the network address configurations are determined based at least on a provider network address for an initial instance of the software service. A provider or other service entity that hosts VM host 530 can provide network addressing (e.g., IP addressing) for some elements used by VM host 530, which can correspond to physical network interfaces of a host computer system, those of router element 531, and those associated with isolated environments 540 and 550. Other addressing can be associated with such elements, such as media access control (MAC) addressing which typically corresponds to a physical or virtual network interface controller, and may be assigned by other entities than control node 520 or the service provider of VM host 530.

After network states have been configured/assigned for ingress traffic nodes and software services within any corresponding virtualized environments, then network traffic might be issued by client nodes for receipt by the software services. For example, client node 510 can originate or otherwise transfer network traffic, such as service requests, data requests, streaming media commands, or other traffic, over link 580 for delivery to software service 545 using an assigned network address. Moreover, this network address might be associated with a particular ingress traffic node, such as ingress traffic node 522 based on various factors including proximity (physical or network routing), latency, availability, a type of software service associated with software service 545, a type of client node associated with client node 510, network status, congestion, network routing considerations, and other factors. As seen in FIG. 5, ingress traffic node 522 might have a network address of 40.40.40.40 associated therewith, while ingress traffic node 521 has 40.40.40.41 and ingress traffic node 523 has 40.40.40.42. Client node can use 40.40.40.40 to on-ramp network traffic intended for software service 545, and as will be discussed below, can maintain use of this network address during and after migration of software service 545 to another location/server.

Thus, ingress traffic node 522 receives (operation 602) ingress traffic transferred by client node 510 for delivery to an ingress network address (e.g., 40.40.40.40) associated with a selected ingress traffic node (522) to software service 545. Ingress traffic node 522 translates (operation 603) the ingress network address to a provider network address for an initial instance of software service 545 and transfers the ingress traffic for delivery to the initial instance of the software service 545 with the provider network address. In this example, the provider network address corresponds to a network address assigned to router element 531 of VM host 530, namely 1.1.1.1. Translator 525 of ingress traffic node 522 can perform this network address translation, using various techniques including NAT (network address translation) of IP addressing from a first address (40.40.40.40) to a second address (1.1.1.1). Translator 525 can maintain various translation tables or other data structures for this purpose. From here, ingress traffic node 522 transfers or forwards (operation 604) the ingress traffic for delivery to router element 531 over link 582, which can optionally include altering the source IP address to 40.40.40.50 as shown in FIG. 5 to provide for return traffic routing to ingress traffic node 522 instead of client node 510.

Router element 531 of VM host 530 can then receive the ingress traffic which has the provider network address over link 583 and determine a further destination for the ingress traffic. These further destinations can include isolated environment 540 or 550 in VM host 530, and several network address translation elements are encountered along these pathways. These address translations provide network isolation for software services within virtualized environments, abstract the network addressing and interfacing from physical hardware resources, and provide for enhanced migration of the software services to different physical hardware resources. Specifically, router element 531 translates the provider network address into a virtual environment network address associated with an initial isolated namespace instantiating the software service. For software service 545, the virtual environment network address is shown as 10.0.0.1 which is associated with isolated environment 540 comprising a namespace housing further translation elements and software service 545. For software service 555, the virtual environment network address is shown as 10.0.0.3 which is associated with isolated environment 550 comprising a namespace housing further translation elements and software service 555.

In one example, router element 531 then transfers the ingress traffic having the virtual environment network address, which is received by translator element 541 of isolated environment 540. Translator element 541 is configured to interface into the initial isolated namespace (isolated environment 540), and translates the virtual environment network address (10.0.0.1) to an internal namespace network address, shown in FIG. 5 as 10.0.0.2. Translator element 541 then transfers the ingress traffic having the internal namespace network address for receipt by another translator element 542. In second translator element 542, another translation occurs to translate the internal namespace network address (10.0.0.2) to a software service network address, shown in FIG. 5 as 172.100.100.1. Translator element 542 then transfers the ingress traffic having the software service network address for receipt by software service 545.

As noted above, network traffic issued by client node 510 can propagate through a series of network links, connections, routers, and translation elements to reach software service 545, which may itself be implemented as a virtualized environment, container, or virtual machine. Software service 545 has network addressing associated therewith, such as the software service network address (172.100.100.1) as well as an address used for return traffic of 172.100.100.100, and associated MAC addressing (e.g., 66:66:66:66:66:66), which can vary based on implementation. However, to provide the enhanced migration of software service 545 to other location, machine, virtual environment, provider, server, or other instance hardware/software platform, the examples herein maintain the same network addressing for software service 545 before, during, and after migration. Moreover, the same network addressing used by client node 510 to reach software service 545 is maintained as the same network addressing before, during, and after migration. As will be discussed, the combination of the ingress traffic node address translation, as well as the use of multiple translator elements in the VM host entities provides for these enhanced operations.

Specifically, a migration trigger is initiated or detected (operation 605), which triggers various network state migration activities for a software service (as well as data/state migration noted herein). In ingress traffic node 522, this trigger event prompts ingress traffic node 522 to withhold transfer of additional or new ingress traffic and buffer (operation 606) any intervening ingress traffic within traffic buffer 528. Before or during the migration timeframe, execution of software service 545 is paused/halted at VM host 530 and software service 545 is instantiated at VM host 560 within isolated environment 570. Various virtualized environment state/data or storage/memory data can be migrated (pre- or post-migration, noted above), and network state can be configured to support the new migrated instance at VM host 560. However, different network addressing will be associated with reaching VM host 560 and migrated software service 545 therein.

Control node 520 can receive this different network addressing associated with VM host 560 from a provider or other service node corresponding to VM host 560, and proceed to update various other nodes with this network addressing. For instance, ingress traffic node 522 receives an updated network address configuration from control node 520, where the updated network address configuration is determined based at least on an updated provider network address for the migrated instance of the software service. The updated network address configuration can be employed for translating among the ingress network address provided in traffic from client node 510 and an updated provider network address for a migrated instance of software service 545 at VM host 560.

Once the updated network configuration is obtained by ingress traffic node 522, and any corresponding migration completion indication has been received/notified (operation 607), then ingress traffic node 522 can resume translating and transferring traffic for delivery to software service 545 using the updated network configuration in translator 525. Ingress traffic node 522 transfers a manifest of the buffered and intervening ingress traffic destined for software service 545. Ingress traffic node 522 can modify buffered ingress traffic with the updated provider network address and transfer the buffered and intervening ingress traffic for delivery to the migrated instance of software service 545 (operation 608). Typically, this buffering is of a short duration (e.g., 100-200 ms), and client node 510 does not observe any appreciable delays in traffic reaching software service 545 during the migration. The migration completion indication denotes that the migrated instance of the software service has started at the new location/machine/provider. After this indication, ingress traffic node 522 can receive further (new) ingress traffic transferred by client node 510 for delivery to the same ingress network address used before migration, then translate the ingress network address to the updated provider network address for the migrated instance of the software service, and transfer the further ingress traffic for delivery to the migrated instance of software service 545 with the updated provider network address. Advantageously, in addition to no interruption in service, client node 510 employs the same unchanged ingress network address (40.40.40.40) to communicate with the initial instance of the software service and the migrated instance of the software service. Thus, the migration can be considered unrevealed and transparent to client node 510.

From here, ingress traffic node 522 transfers or forwards the ingress traffic for delivery to router element 561 over link 582, which can optionally include altering the source IP address to 40.40.40.50 as shown in FIG. 5 to provide for return traffic routing to ingress traffic node 522 instead of client node 510. Router element 561 of VM host 560 can then receive the ingress traffic which has the updated provider network address over link 584 and determine a further destination for the ingress traffic. These further destinations can include isolated environment 570 in VM host 560, and several network address translation elements are encountered along these pathways. These address translations provide network isolation for software services within virtualized environments, abstract the network addressing and interfacing from physical hardware resources, and provide for enhanced migration of the software services to different physical hardware resources. Specifically, router element 561 translates the updated provider network address into a (migrated) virtual environment network address associated with an (migrated) initial isolated namespace instantiating the software service. For migrated software service 545, the (migrated) virtual environment network address is shown as 10.0.0.4 which is associated with isolated environment 570 comprising a namespace housing further translation elements and migrated software service 545.

In one example, router element 561 then transfers the ingress traffic having the (migrated) virtual environment network address, which is received by translator element 571 of isolated environment 570. Translator element 571 is configured to interface into the initial isolated namespace (isolated environment 570), and translates the (migrated) virtual environment network address (10.0.0.4) to an (migrated) internal namespace network address, shown in FIG. 5 as 10.0.0.5. Translator element 571 then transfers the ingress traffic having the (migrated) internal namespace network address for receipt by another translator element 572. In second translator element 572, another translation occurs to translate the (migrated) internal namespace network address (10.0.0.5) to a software service network address, shown in FIG. 5 as 172.100.100.1, which is the same as pre-migration. Translator element 572 then transfers the ingress traffic having the software service network address for receipt by migrated software service 545.

Thus, a network address for software service 545 internal to an initial isolated namespace (540) instantiating the initial instance of software service 545 comprises a same network address for migrated software service 545 internal to a subsequent isolated namespace (570) instantiating the migrated instance of the software service 545. In contrast, the provider network address comprises a different network address from the updated provider network address. This provides network migration of a network state for software service 545, as implemented across various ingress traffic nodes, control node 520, and various virtualized entities. Moreover, although IP addressing is discussed in FIG. 5, various TCP addressing (such as MAC addresses) can be employed along the various network links and pathways. These might also change to suit the various initial and migrated instances of the surrounding structures for software service 545, but software service 545 itself maintains the same MAC address and IP address before, during and after migration. Any network translation for various network layers among the TCP/IP arrangement can occur among translator elements 541, 542, 551, 552, 571, and 571, among others.

Translator elements shown in FIG. 5, such as translator element 541, 542, 551, 552, 571, 571, and any of the ingress traffic node translators, can be implemented as various hardware or software execution units capable of performing NAT operations, among other operations. In one example implementation, one or more of these translator elements execute as extended kernel functions executed at runtime. Examples of such kernel functions include remote procedure call (RPC) frameworks, such as the Google gRPC comprising an open-source, high-performance RPC framework developed by Google in 2015.

Turning now to FIG. 7, additional migration of network connections and network properties for a software service is shown in one example implementation. Specifically, FIG. 7 illustrates migration of egress traffic routing for a software service migrating from a first instance to a second instance. Egress traffic refers to network traffic initiated and transferred by a software service for delivery to external nodes or destinations, such as other application services or nodes, client nodes, or other third-party destinations. To transfer such egress traffic, an originating software service typically includes network addressing among packets or frames to reach the destination. This network addressing, as will be discussed below, is abstracted from an actual network address of a destination, to provide for the instantiation and migration of the software service within an isolated environment, such as a network namespace within a virtualized environment or virtual machine. By abstracting the network addressing for a software service, a destination node can continue to communicate using the same network addressing to reach a software service both before and after migration of the software service from one instance to another instance.

One example of egress traffic handling is shown in system 700 of FIG. 7. System 700 includes control node 710, egress traffic nodes 711-713, VM host 730, VM host 750, and target node 770. An explicitly labeled client node is omitted from FIG. 7, but in some examples a client node can comprise target node 770. However, target node 770 can comprise nodes other than client nodes, such as application nodes, database nodes, third-party nodes, destination nodes, and other destinations. Target node 770 can communicate with any among egress traffic nodes 711-713 over network link 780. Control node 710 can communicate with any among egress traffic nodes 711-713 over network link 781. Egress traffic nodes 711-713 can communicate with various nodes, such as with VM hosts 730 and 750 over associated network links, such as network links 782-784. VM hosts 730 and 750 can communicate over network links 785 and 786 coupled to router elements 731 and 751. Router elements 731 and 751 can be virtualized network router elements corresponding to physical network interfaces (not shown) of host computing devices or host compute units.

Target node 770 comprises various computing nodes having interface elements, network interfacing elements, data processing and storage elements, and other various components. Examples include those discussed above for client node(s) 110 above, database nodes, cloud computing nodes, authentication and authorization nodes, application service provider nodes, third-party access nodes, among others.

Egress traffic nodes 711-713 comprise one or more network routing, handling, traffic processing, and transport elements or equipment. Egress traffic nodes 711-713 can include various network switching circuitry to communicatively link individual network links to other network links based on network addressing, traffic patterns, network status, or other traffic properties. In this example, egress traffic nodes 711-713 include route processor elements, such as route processor element 714, as well as buffer elements. Route processor elements comprise network route processing (detection, evaluation, and translation) elements, including software components, data processing elements, routing table storage elements, network router elements, and other components.

Control node 710 comprises control elements for instructing egress traffic nodes 711-713 and VM hosts 730 and 750 with regard to the various operational scenarios described herein. Control node 710 can include one or more microprocessors and other processing circuitry that retrieves and executes software, and any number of control software applications, from an associated storage system. Each processing element can be implemented within a single processing device but can also be distributed across multiple processing devices or sub-systems that cooperate in executing program instructions. Examples of each processing module include general purpose central processing units, application specific processors, and logic devices, as well as any other type of processing device, combinations, or variations thereof. In FIG. 7, control node 710 can take inputs from various external elements and nodes, and perform various control operations based at least on these inputs.

As shown in FIG. 7, software service 745 is initially executed at a host node within isolated environment 740 as a part of a virtualized environment, e.g., VM host 730. VM host 730 also includes router element 731 which comprises a virtualized router configured to route or otherwise handle network traffic between external network links/nodes and network elements internal to VM host 730, such as those for isolated environment 740. Furthermore, VM hosts 730 and 750 might further include virtualized environments within their own virtualized environments. These embedded, recursive, or nested virtualized environments can include those to instantiate software service 745. Thus, software service 745 can comprise a further virtualized environment nested within another virtualized environment (e.g., VM hosts 730 and 750), where the further virtualized environment has a network interface and instantiates a client-facing software service.

VM hosts 730 and 750 can be hosted by physical computing platforms, such as shown for hosts 120 and 140, although variations are possible. Thus, these physical computing platforms might include various hardware elements including processing elements, data storage and memory elements, network interfaces, and optional user interface elements. The hardware and host software elements (e.g., host operating systems) can be isolated or virtualized from payload software elements by a virtualization system, which can include one or more virtualized environments represented by VM host 730 and 750 in FIG. 7.

FIG. 7 shows various functional elements which are interconnected by network links. The actual network links are omitted from FIG. 7 for most of the functional elements, but are shown as exemplary links 780-786. Links 780-786 can comprise any type of network link formed from one or more physical links comprising electrical, optical, or wireless signaling layers. Various network protocols and traffic types can be carried by such links, such as TCP/IP or other similar protocols associated with various network stacks and transport/internet layers. The examples herein are not intended to limit the links to any particular protocol or network link type. Also, these network links can carry various frames, packets, datagrams, or other granular data representation, which can vary based on the exact link/protocol employed. Typically, addressing used for routing the traffic is included in a header portion of a packet or frame, with payload portions configured to carry data or other packets/frames with associated addressing.

Turning now to various operational scenarios for FIG. 7, operations 800 and 810 of FIG. 8 are presented. In operation 801, an initial instance of a software service is established, such as show for software service 745 in isolated environment 740 of VM host 730. Along with instantiating software service 745 and various storage/memory elements discussed above, corresponding network interfaces and network states can be established. These network states include various network addressing, network properties of isolated environment 740, network routing tables, ingress/egress configurations, and other states and properties. In one example, egress traffic nodes and router elements of the VM hosts receive network address configurations from control node 710, where the network address configurations are determined based at least on a provider network address for an initial instance of the software service. A provider or other service entity that hosts VM host 730 can provide network addressing (e.g., IP addressing) for some elements used by VM host 730, which can correspond to physical network interfaces of a host computer system, those of router element 731, and those associated with isolated environment 740. Other addressing can be associated with such elements, such as media access control (MAC) addressing which typically corresponds to a physical or virtual network interface controller, and may be assigned by other entities than control node 710 or the service provider of VM host 730.

In addition to network addressing and other network properties, egress traffic nodes can be selected to service egress traffic for software service 745 and for target node 770. The egress traffic nodes can be selected based on various factors, such as proximity (geographic or network), latency, service availability, congestion, cost, bandwidth, routing properties, or other factors. In FIG. 7, a first egress traffic node 712 is selected for software service 745 (operation 801) and a second egress traffic node 711 is selected for target node 770 (operation 802). In this example, egress traffic nodes for each among target node 770 and software service 745 are selected based on a lowest traffic latency between the corresponding target node or provider node (hosting software service 745) and a particular egress traffic node. Egress traffic node 711-712 can be configured with various network routing configurations and NAT network addressing tables based on commands or instructions received from control node 710, among other control entities.

After network states have been configured/assigned for egress traffic nodes and software services within any corresponding virtualized environments, as well as egress traffic nodes selected for individual nodes, then network traffic might be issued by software service 745 for receipt by target node 770. For example, software service 745 can originate or otherwise transfer network traffic, such as service requests, data requests, streaming media, commands, or other traffic, over link 785 for delivery to target node 770 using an assigned network address. Moreover, this network address might be associated with a particular egress traffic node, such as egress traffic node 712. As seen in FIG. 7, egress traffic node 712 might have a network address of 40.40.40.61 associated therewith, while egress traffic node 711 has 40.40.40.60 and egress traffic node 713 has 40.40.40.62. Software service 745 can use a network address associated with target node 770 and router element 731 can the translate this network address and use 40.40.40.61 to on-ramp network traffic intended for target node 770 at egress traffic node 712.

Similar to that discussed in FIG. 5, a software service might have various network abstractions, translations (NAT or otherwise), isolations, and other elements configured to isolate a network namespace and network address of software service 745 to provide enhanced migration services. In this example, software service 745 has source IP address of 172.100.100.100 (with corresponding destination IP address of 172.100.100.1), and traffic issued by software service 745 first is delivered to router element 731 of VM host 730, which may include various translator elements for entry/exit from isolated environment 740, such as those noted for ingress traffic in FIG. 5. Router element 731 is configured to communicate with egress traffic node 712 over link 785 and router element 731 transfers or routes (operation 803) this traffic for delivery to a network address associated with egress traffic node 712 (40.40.40.61), instead of an IP address of target node 770. Thus, egress traffic node 712 receives initial egress traffic transferred by the initial instance of software service 745 for delivery to a destination node (e.g., target node 770) through a first egress traffic node 712.

From here, egress traffic node 712 receives the egress traffic (operation 804). Egress traffic node 712, which includes a route processor element, can process the egress traffic issued by software service 745 to determine a route (operation 805) to an egress traffic node associated with target node 770 and perform a NAT process to translate any associated network addressing to achieve such a route. In this example, egress traffic node 711 is associated with target node 770, and egress traffic node 712 determines that IP address 40.40.40.60 should be used to reach egress traffic node 711. Egress traffic node 712 updates a destination IP address of the egress traffic with the aforementioned IP address for egress traffic node 711. Moreover, egress traffic has a return IP address updates to one associated with egress traffic node 712 (40.40.40.71), and this egress traffic is transferred for delivery (operation 806) to egress traffic node 711 associated with target node 770 over link 783. This egress traffic can transit various network links, networks, internetworks, internets, and other arrangements to reach egress traffic node 711 over link 782.

At egress traffic node 711, the egress traffic can have a source network address updated using a NAT process by route processor 714 to one associated with egress traffic node 711, such as 40.40.40.70. This egress traffic can then be transferred for delivery to target node 770 (operation 807), which receives the egress traffic over link 780. Target node 770 might then have return traffic in response to the egress traffic, referred to herein as egress return traffic. This egress return traffic might comprise a response to a request issued by software service 745, return data, acknowledgement packets, heartbeat packets, new unrelated traffic, or other various network traffic. Target node 770 issues this egress return traffic using a network address associated with egress traffic node 711 (40.40.40.70) and transfers over link 780.

From here, egress traffic node 711 receives the egress return traffic. Egress traffic node 711, which includes route processor element 714, can process the egress return traffic issued by target node 770 to determine a route to an egress traffic node associated with software service 745 and perform a NAT process to translate any associated network addressing to achieve such a route. However, the route determination might take several forms, and the selected technique can vary in real-time or based on various criteria. The route typically transits over one or more networks, such as the Internet at-large, which is represented in FIG. 7. This route can encompass many intermediary steps, hops, routes, links, and associated equipment. In one example, at least a portion of a network route from egress traffic node 711 to egress traffic node 712 is determined by processing a network address associated with egress traffic node 711 and/or egress traffic node 712 against a global border gate protocol (BGP) routing table for the entire Internet that is cloned or cached locally at egress traffic node 711. This global BGP can comprise a large dataset, on the order of gigabytes (GB) of data, and can be cached into one or more storage devices of egress traffic node 711, and can be continually updated from Internet-based nodes that house official copies of such data. A /24 CIDR address format can be employed in this example to provide such route determination. Based on processing the network addressing of the egress return traffic against this global BGP data set, a route can be determined to reach egress traffic node 712. In another example, the egress return data can be transferred by egress traffic node 711 and employ classic Internet-based route selection, such that any links/routers along the pathway from egress traffic node 711 to egress traffic node 712 are selected en route. This second example thus employs the Internet global BGP, but as employed by various distributed and distant routing control nodes found throughout the Internet at-large. This second example is typically slower than the first example with a locally cloned global BGP data set.

To continue the egress return traffic routing operations, egress traffic node 712 is associated with software service 745, and egress traffic node 711 determines that IP address 40.40.40.71 should be used to reach egress traffic node 712. Egress traffic node 711 updates a destination IP address of the egress traffic with the aforementioned IP address for egress traffic node 712. Moreover, egress traffic has a return IP address updates to one associated with egress traffic node 711 (40.40.40.60), and this egress traffic is transferred for delivery (operation 811) to egress traffic node 712 associated with a provider node hosting software service 745. This egress traffic can transit various network links, networks, internetworks, internets, and other arrangements to reach egress traffic node 712 over link 783.

At present, the initial instance of software service 745 has not yet been migrated, and thus egress node 712 determines that no further egress routing is necessary to reach router element 731 (operation 813, 814, and 815). Thus, the network traffic corresponding to the egress return traffic is delivered to router element 731, which then routes the egress return traffic for delivery to software service 745 through various translator elements (such as those shown in FIG. 5).

At some point during operation of software service 745, a migration trigger event is produced, such as by control node 710, and notified to various elements among system 700, including egress traffic nodes (operation 821). This migration trigger event then initiates various network state migration activities for a software service (as well as data/state migration and ingress traffic routing noted herein). Before or during the migration timeframe, execution of software service 745 is paused/halted at VM host 730 and software service 745 is instantiated at VM host 750 within isolated environment 760. Various virtualized environment state/data or storage/memory data can be migrated (pre- or post-migration, noted above), and network state can be configured to support the new migrated instance at VM host 750. However, different network addressing will be associated with the migrated instance of software service 745 at VM host 750, as well as different network locations for VM host 750 versus VM host 730.

Control node 710 can receive this different network addressing associated with VM host 750 from a provider or other service node corresponding to VM host 750. Control node 710 can determine an updated egress traffic node to be associated with migrated software service 745 at VM host 750, and in some instances determines another updated egress traffic node to be associated with target node 770 (operation 822). The different egress traffic nodes for after migration of software service 745 can be selected according to criteria noted above, such as based on traffic latency, network proximity, geographic proximity, or other factors.

Control node 710 updates various nodes with this network addressing and indications of the updated/selected egress traffic nodes (operation 823). For instance, egress traffic node 712 receives an updated network address configuration from control node 710 which indicates that migrated software service 745 is associated with a different egress traffic node, such as egress traffic node 713, and egress traffic node 711 receives an updated network address configuration that indicates egress traffic node 713 is to be used to reach migrated software service 745. The updated network address configuration can be employed for determining routing of egress traffic and egress return traffic among egress traffic nodes, as well as for maintaining the same network addressing for endpoint nodes (e.g., target node 770) to reach migrated software service 745.

Once the updated network configuration and egress traffic node selections are made/distributed, and any corresponding migration completion indication has been received/notified, then operation can resume for migrated software service 745. However, after migration, router element 751 in VM host 750 will employ address 40.40.40.62 to reach egress traffic node 713 instead of 40.40.40.61 to reach egress traffic node 712. In some examples, egress traffic or egress return traffic might be buffered in one or more egress traffic nodes during migration, such that after migration, a manifest of such traffic is delivered using updated addressing for the migrated instance of the software service. This can occur similar to that of the ingress traffic buffering noted above, and for a short duration of 100-200 ms. The migration completion indication denotes that the migrated instance of the software service has started at the new location/machine/provider.

After migration completes, egress traffic node 713 can receive further (new) egress traffic transferred by migrated software service 745 for delivery to the same network address to reach target node 770 used before migration. Egress traffic node 713 then translates the return network address to that of egress traffic node 713, and transfers the egress traffic for delivery to egress traffic node 711. In addition to no noticeable interruption in service to endpoints, target node 770 and the migrated initial of software service 745 employs the same unchanged network addressing as before migration, while the egress traffic and egress return traffic are routed through one or more different egress traffic nodes after migration. Thus, the migration can be considered unrevealed and transparent to target node 770 and software service 745. Advantageously, by selecting different egress nodes for software service 745 based on the migration, a lowest latency egress traffic node can be selected at all times, for all instances of software service and for other nodes.

To further discuss egress traffic and egress return traffic after migration, the following operations can be performed, similar to that noted above for operations 800 and 810. Network traffic might be issued by migrated software service 745 at VM host 750 for receipt by target node 770. For example, migrated software service 745 can originate or otherwise transfer network traffic, such as service requests, data requests, streaming media, commands, or other traffic, over link 786 for delivery to target node 770 using an assigned network address. Moreover, this network address might be associated with a particular egress traffic node, such as egress traffic node 713. As seen in FIG. 7, egress traffic node 713 might have a network address of 40.40.40.62 associated therewith, while egress traffic node 711 has 40.40.40.60. Migrated software service 745 can use a network address associated with target node 770 (same network address before migration) and router element 751 can the translate this network address and use 40.40.40.62 to on-ramp network traffic intended for target node 770 at egress traffic node 713.

Migrated software service 745 might have various network abstractions, translations (NAT or otherwise), isolations, and other elements configured to isolate a network namespace and network address of migrated software service 745. In this example, migrated software service 745 has source IP address of 172.100.100.100 (with corresponding destination IP address of 172.100.100.1), and traffic issued by migrated software service 745 first is delivered to router element 751 of VM host 750, which may include various translator elements for entry/exit from isolated environment 760, such as those noted for ingress traffic in FIG. 5. Router element 751 is configured to communicate with egress traffic node 713 over link 786 and router element 751 transfers or routes (operation 803) this traffic for delivery to a network address associated with egress traffic node 713 (40.40.40.62), instead of an IP address of target node 770. Thus, egress traffic node 713 receives initial egress traffic transferred by the migrated instance of software service 745 for delivery to a destination node (e.g., target node 770) through a post-migration egress traffic node 713.

From here, egress traffic node 713 receives the egress traffic (operation 804). Egress traffic node 713, which includes a route processor element, can process the egress traffic issued by migrated software service 745 to determine a route (operation 805) to an egress traffic node associated with target node 770 and perform a NAT process to translate any associated network addressing to achieve such a route. In this example, egress traffic node 711 is still associated with target node 770, and egress traffic node 713 determines that IP address 40.40.40.60 should be used to reach egress traffic node 711. Egress traffic node 713 updates a destination IP address of the egress traffic with the aforementioned IP address for egress traffic node 711. Moreover, egress traffic has a return IP address updated to one associated with egress traffic node 713 (40.40.40.72), and this egress traffic is transferred for delivery (operation 806) to egress traffic node 711 associated with target node 770 over link 784. This egress traffic can transit various network links, networks, internetworks, internets, and other arrangements to reach egress traffic node 711 over link 782.

At egress traffic node 711, the egress traffic can have a source network address updated using a NAT process by route processor 714 to one associated with egress traffic node 711, such as 40.40.40.70. This egress traffic can then be transferred for delivery to target node 770 (operation 807), which receives the egress traffic over link 780. Target node 770 might then have return traffic in response to the egress traffic, referred to herein as egress return traffic. This egress return traffic might comprise a response to a request issued by software service 745, return data, acknowledgement packets, heartbeat packets, new unrelated traffic, or other various network traffic. Target node 770 issues this egress return traffic using a network address associated with egress traffic node 711 (40.40.40.70) and transfers over link 780.

From here, egress traffic node 711 receives the egress return traffic. Egress traffic node 711, which includes route processor element 714, can process the egress return traffic issued by target node 770 to determine a route to an egress traffic node associated with migrated software service 745 and perform a NAT process to translate any associated network addressing to achieve such a route. However, the route determination might take several forms, and the selected technique can vary in real-time or based on various criteria. The route typically transits over one or more networks, such as the Internet at-large, which is represented in FIG. 7. This route can encompass many intermediary steps, hops, routes, links, and associated equipment. In one example, at least a portion of a network route from egress traffic node 711 to egress traffic node 713 is determined by processing a network address associated with egress traffic node 711 and/or egress traffic node 713 against a global border gate protocol (BGP) routing table for the entire Internet that is cloned or cached locally at egress traffic node 711. This global BGP can comprise a large dataset, on the order of gigabytes (GB) of data, and can be cached into one or more storage devices of egress traffic node 711, and can be continually updated from Internet-based nodes that house official copies of such data. A /24 CIDR address format can be employed in this example to provide such route determination. Based on processing the network addressing of the egress return traffic against this global BGP data set, a route can be determined to reach egress traffic node 713. In another example, the egress return data can be transferred by egress traffic node 711 and employ classic Internet-based route selection, such that any links/routers along the pathway from egress traffic node 711 to egress traffic node 713 are selected en route. This second example thus employs the Internet global BGP, but as employed by various distributed and distant routing control nodes found throughout the Internet at-large. This second example is typically slower than the first example with a locally cloned global BGP data set.

To continue the egress return traffic routing operations, egress traffic node 713 is associated with migrated software service 745, and egress traffic node 711 determines that IP address 40.40.40.72 should be used to reach egress traffic node 713. Egress traffic node 711 updates a destination IP address of the egress traffic with the aforementioned IP address for egress traffic node 713. Moreover, egress traffic has a return IP address updates to one associated with egress traffic node 711 (40.40.40.60), and this egress traffic is transferred for delivery (operation 811) to egress traffic node 713 associated with a provider node hosting migrated software service 745. This egress traffic can transit various network links, networks, internetworks, internets, and other arrangements to reach egress traffic node 713 over link 784.

Figure 9:
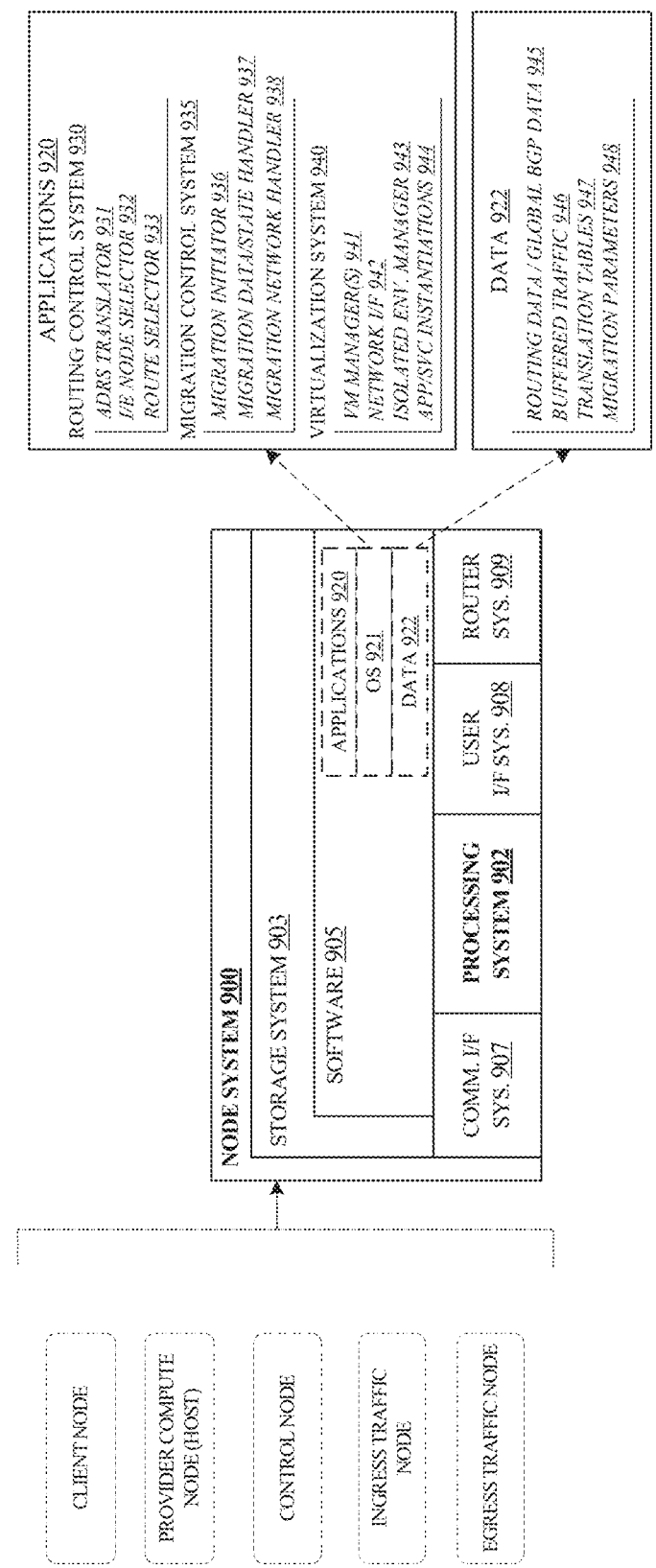
FIG. 9 illustrates an example node system capable of implementing any of the various nodes, control elements, routers, translators, virtualized systems, and associated elements discussed herein.

FIG. 9 illustrates node system 900 and associated software 905 in an implementation. FIG. 9 illustrates node system 900 that is representative of any system or collection of systems in which the various operational architectures, scenarios, and processes disclosed herein may be implemented. For example, node system 900 can be used to implement client nodes, provider nodes (such as VM hosts, servers, hardware for virtualized environments), control nodes, ingress traffic nodes, egress traffic nodes, and various other endpoint, control, and routing nodes discussed herein. Specifically, client nodes 110, network traffic nodes 190, and host nodes 120 and 140 of FIG. 1 might be implemented by elements of node system 900. Client nodes 310, network traffic nodes 390, host nodes 320 and 340, and data storage system 360 of FIG. 3 might be implemented by elements of node system 900. Client node 510, control node 520, ingress traffic nodes 521-523, and host machines for VM hosts 530 and 560 of FIG. 5 might be implemented by elements of node system 900. Control node 710, egress traffic nodes 711-713, host machines for VM hosts 730 and 750, and target node 770 of FIG. 7 might be implemented by elements of node system 900. Variations on these implementations are possible, with some examples only employing a selected portion of the elements discussed for node system 900.

Node system 900 may be implemented as a single apparatus, system, or device or may be implemented in a distributed manner as multiple apparatuses, systems, or devices. Node system 900 includes, but is not limited to, processing system 902, storage system 903, software 905, communication interface system 907, user interface system 908, and router system 909. Processing system 902 is operatively coupled with storage system 903, communication interface system 907, user interface system 908, and router system 909.

Processing system 902 loads and executes software 905 from storage system 903. Software 905 includes applications 920, which are representative of the processes, services, and platforms discussed with respect to the included Figures. Various portion of software 905 might be included or excluded based on what type of node or system is implemented by node system 900. Thus, all software elements might not be present in every implementation of node system 900. When executed by processing system 902 software 905 directs processing system 902 to operate as described herein for at least the various processes, operational scenarios, and sequences discussed in the foregoing implementations. Node system 900 may optionally include additional devices, features, or functionality not discussed for purposes of brevity.

Referring still to FIG. 9, processing system 902 may comprise a microprocessor and processing circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic memory, magnetic storage devices, or any other suitable storage media. In no case is the computer readable storage media a propagated signal. In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions comprising applications 920, operating system 921, and data 922. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include applications 920. Software 905 may also comprise firmware or some other form of machine-readable processing instructions executable by processing system 902.

Software 905, when loaded into processing system 902 and executed, may transform a suitable apparatus, system, or device (of which node system 900 is representative) overall from a general-purpose computing system into a special-purpose computing system customized to implement client nodes, provider nodes, control nodes, ingress traffic nodes, egress traffic nodes, and various other endpoint, control, and routing nodes discussed herein. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors. For example, if the computer-readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 920 can include routing control system 930, migration control system 935, and virtualization system 940. Routing control system 930 includes address translator 931, ingress/egress node selector 932, and route selector 933. Migration control system 935 includes migration initiator 936, migration data/state handler 937, and migration network handler 938. Virtualization system 940 includes virtual machine managers 941, network interface 942, isolated environment manager 943, and application/service instances 944.

Turning first to routing control system 930, address translator 931 performs various network address translation and packet/frame updating for altering network addressing associated with received and transferred network traffic. This can include NAT functions using routing data 945 or translation tables 947 in data 922. Ingress/egress node selector 932 can include operations to select specific ingress or egress traffic nodes according to various criteria noted herein to provide ingress or egress of network traffic for endpoint nodes including client nodes, software services, and other elements. Ingress/egress node selector 932 can select nodes responsive to migration triggers or to initial instantiates of software services, or according to various changes in network conditions, among other factors. Route selector 933 can provide route selection across one or more networks to route egress or ingress traffic among pairs of egress nodes or pairs of ingress nodes, among other nodes. Route selector 933 might use the routing of external routers, such as the Internet, or may determine routes based on locally cached versions of global routing tables or global BGP tables stored in data 922.

Turning next to migration control system 935, migration initiator 936 includes detection routines that determine when a software service is to be migrated from an initial instance to a migrated instance. Triggers for this migration can include various criteria included in migration parameters 948, such as network conditions, network congestion, provider costs, bandwidth costs, provider availability changes, altered locality preferences of clients, time of day, day/month, provider policy changes or terms, or other factors discussed herein. Migration data/state handler 937 determines which data is to be migrated for software services, such as done for the pre/post migration techniques discussed herein, can establish various mappings or block devices that implement memory/storage devices of virtualized software services, and can perform copying or migration of data/state during migration operations. Migration network handler 938 performs migration of network state and network addressing for migration of software services, including determination of new network addressing provided by new providers/hosts, updating of ingress/egress traffic nodes with network addressing before and at migration, and indications to router elements of VM hosts of network addressing changes for instantiation and migration of software services.

Turning next to virtualization system 940 virtual machine managers 941 instantiate one or more virtualized environments that host software services, such as VM hosts, to perform the functions of the software services on the associated host hardware or machines. Virtual machine managers 941 can establish router elements (through network interface 942) which communicate with isolated environments or network namespaces for software services, and establish instances of software services within such isolated environments or network namespaces. Isolated environment manager 943 can work with virtual machine managers 941 to establish isolated environments or network namespaces, as well as establish translator elements to translate network traffic addressing among various network address spaces such that software services can be instantiated with the same network addressing for each instance. Application/service instances 944 include actual instantiations of software services, which can include virtualized instantiations, and instantiations of initial and migrated software services.

Communication interface system 907 may include communication connections and devices that allow for communication with other computing systems or electrical components (not shown) over communication links or communication networks (not shown). Examples of connections and devices that together allow for inter-system communication may include network interface controllers, network interfacing circuitry, transceivers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 907 can provide network information, router information, and other information. Communication interface system 907 may include portions of router system 909 or communication interfaces for communicating with router equipment.

Communication between communication node system 900 and other elements or systems (not shown), may occur over communication links or communication networks and in accordance with various communication protocols, combinations of protocols, or variations thereof provided by at least communication interface system 907. For example, communication node system 900 when implementing a control device, might communicate with sensor elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc.), the transmission control protocol (TCP), and the user datagram protocol (UDP), as well as any other suitable communication protocol, variation, or combination thereof.

User interface system 908 is optional in some implementations, and may include a software or virtual interface such as a terminal interface, command line interface, or application programming interface (API). User interface system 908 may also include physical user interfaces, such as keyboard, a mouse, a voice input device, or a touchscreen input device for receiving input from a user. User interface system 908 may include telemetry interfaces, router status interfaces, user command controls, router operation mode command controls, and user interface indications, visualizations, and representations, among others. Output devices such as displays, web interfaces, terminal interfaces, and other types of output devices may also be included in user interface system 908. User interface system 908 can provide output and receive input over a network interface, such as communication interface system 907. In network examples, user interface system 908 might packetize data for receipt by a display system or computing system coupled over one or more network interfaces. User interface system 908 may comprise API elements for interfacing with users, other data systems, other user devices, web interfaces, and the like. User interface system 908 may also include associated user interface software executable by processing system 902 in support of the various user input and output devices discussed above. Separately or in conjunction with each other and other hardware and software elements, the user interface software and user interface devices may support a console user interface, graphical user interface, a natural user interface, or any other type of user interface.

Router system 909 comprises various hardware and software elements for interfacing with router equipment, or alternatively, router equipment configured to route network traffic. Router system 909 includes one or more network interfaces, including network interface controller circuitry capable of receiving and transferring network traffic employed for corresponding network links and various layered protocols. Router system 909 can comprise network traffic translation elements configured to perform NAT functions, which can include portions of software 905. Moreover, router system 909 can comprise one or more software components which execute via processing system 902 to perform network traffic routing, translation, buffering, ingress/egress handling, and other operations. Router system 909 can comprise elements of communication interface system 907, such as those for physically interfacing with network links (e.g., Ethernet or various IP-compatible links). Router system 909 can also perform various modification of network traffic, including network frames or network packets, to modify addressing of header portions, perform deep packet inspection for routing optimization, and other functions. These various operations and functions can be performed by software 905 executed by processing system 902, or may include dedicated processing hardware and interface circuitry.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Furthermore, it should be understood that the disclosures and enhancements herein are applicable across a range of suitable systems, elements, and operations. For example, network links and network protocols can vary based on application, and may evolve according to changes and adoption of different standards. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
    establishing a first instance of a software service in a first network namespace of a first virtualized environment;
    mapping main memory of the first virtualized environment to a first file within a first block device instantiated for the first instance;
    pre-migrating the main memory of the first virtualized environment by periodically synchronizing contents of the first block device to a migration storage location coupled over a first network link;
    responsive to a migration trigger event, initiating a migration operation to establish a second instance of the software service in a second network namespace of a second virtualized environment;
    mapping main memory of the second virtualized environment to a second file within a second block device instantiated for the second instance;

directing the second instance of the software service to reference the first block device at the migration storage location over a second network link to resume a state of the first instance using contents of the first block device corresponding to the main memory established by the first virtualized environment;

transferring un-migrated contents of the main memory of the first virtualized environment to the second file.

2. The method of claim 1, comprising:
maintaining service to a client node from the first instance during the migration operation until at least the un-migrated contents are transferred to the second instance; and
responsive to transfer of the un-migrated contents, servicing the client node from the second instance.

3. The method of claim 1, wherein the un-migrated contents comprise updates to pre-migrated contents of the first block device.

4. The method of claim 1, comprising:
translating network traffic originated by a client node and directed to the software service at a destination network address into a first instance address and transferring the network traffic for delivery to the first virtualized environment at the first instance address;
in a router element of the first virtualized environment, receiving the network traffic directed to the first instance address and routing the network traffic to a first translator element configured to translate among network addressing external to the first network namespace and network addressing associated with a second translator element internal to the network namespace; and
in the second translator element, translating the network traffic for delivery to a network address assigned to the software service.

5. The method of claim 4, wherein the first translator element and the second translator element execute as extended kernel functions executed at runtime.

6. The method of claim 1, wherein the migration operation further comprises migrating network addressing properties of the first instance such that a client node retains a destination network address associated with the first instance to communicate with the second instance; and comprising:
responsive to migrating the network addressing properties of the first instance, translating additional network traffic originated by the client node and directed to the software service at the destination network address into a second instance address and transferring the network traffic for delivery to the second virtualized environment at the second instance address;
wherein the software service uses the network address in the first instance and in the second instance.

7. The method of claim 1, wherein the second instance of the software service is hosted at a second location and second service provider different than a first location and first service provider that hosted the first instance of the software service.

8. The method of claim 1, comprising:
periodically synchronizing the contents of the first block device by at least employing a mapshare operation of an mmap kernel function for a hypervisor managing the first virtualized environment.

9. The method of claim 1, comprising:
directing the second instance of the software service to reference the migration storage location over the second network link until transfer of pre-migrated contents of the first block device to the second instance.

10. The method of claim 1, comprising:
buffering intervening traffic received from a client node during at least the migrating of network addressing properties of the first instance; and
responsive to migrating the network addressing properties of the first instance, transferring the intervening traffic to the second instance with at least updated network addressing properties associated with the second instance.

11. The method of claim 1, wherein the first virtualized environment and the second virtualized environment each comprise at least one among a virtual machine, operating system level virtualization, application-level virtualization, system virtual machine, process virtual machine, or containerized environment.

12. The method of claim 1, wherein the software service comprises a further virtualized environment nested within the first virtualized environment or the second virtualized environment.

13. A system, comprising:
a first virtualized environment comprising a first instance of a software service in a first network namespace, and configured to map main memory of the first virtualized environment to a first file within a first block device instantiated for the first instance; and
a migration element configured to pre-migrate the main memory of the first virtualized environment by periodically synchronizing contents of the first block device to a migration storage location over a first network link, and responsive to a migration trigger event that establishes a second instance of the software service in a second network namespace of a second virtualized environment:
map main memory of the second virtualized environment to a second file within a second block device instantiated for the second instance;
direct the second instance to reference the first block device at the migration storage location over a second network link to resume a state of the first instance using contents of the first block device corresponding to the main memory established by the first virtualized environment; and
transfer un-migrated contents of the main memory of the first virtualized environment to the second file.

14. The system of claim 13, comprising:
the first virtualized environment configured to provide service to a client node from the first instance until at least the un-migrated contents are transferred to the second instance.

15. The system of claim 13, wherein the un-migrated contents comprise updates to pre-migrated contents of the first block device.

16. The system of claim 13, comprising:
the migration element configured to migrate network addressing properties of the first instance such that a client node retains destination network address associated with the first instance to communicate with the second instance; and
the first virtualized environment comprising:
a router element configured to receive, over a first instance address, network traffic originated by the client node and directed to the software service at the destination network address, and route the network traffic to a first translator element;
the first translator element configured to translate among network addressing external to the first network namespace and network addressing associated with a second translator element internal to the network namespace; and the second translator element configured to translate the network traffic for delivery to a network address assigned to the software service.

17. The system of claim 13, wherein the second instance of the software service is hosted at a second location and second service provider different than a first location and first service provider that hosted the first instance of the software service.

18. The system of claim 13, comprising:

the first virtualized environment configured to periodically synchronize the contents of the first block device by at least employing a mapshare operation of an mmap kernel function for a hypervisor managing the first virtualized environment.

19. The system of claim 13, wherein the first virtualized environment comprises at least one among a virtual machine, operating system level virtualization, application-level virtualization, system virtual machine, process virtual machine, or containerized environment.

20. An apparatus, comprising:

a processing system operatively coupled with one or more computer readable storage media; and program instructions stored on the one or more computer readable storage media that, based at least on being read and executed by the processing system, direct the processing system to at least:

establish a first virtualized environment comprising a first instance of a software service in a first network namespace;

map main memory of the first virtualized environment to a first file within a first block device;

pre-migrate the main memory of the first virtualized environment by periodically synchronizing contents of the first block device to a migration storage location over a first network link; and responsive to a migration trigger event, transfer un-migrated contents of the main memory of the first virtualized environment for delivery to a second file within a second block device that maps main memory of a second virtualized environment for a second instance of the software service.

* * * * *